United States Patent [19]

Salvatore, Jr. et al.

[11] Patent Number: 5,920,318

[45] Date of Patent: Jul. 6, 1999

[54] METHOD AND APPARATUS FOR LOCALIZING AN OBJECT WITHIN A SECTOR OF A PHYSICAL SURFACE

[75] Inventors: Gerald P. Salvatore, Jr., Northport; Shiu Ming Tsang, Queens, both of N.Y.

[73] Assignee: Northrop Grumman Corporation, Los Angeles, Calif.

[21] Appl. No.: 08/824,893

[22] Filed: Mar. 26, 1997

[51] Int. Cl.$^6$ .................................................. G06F 12/00
[52] U.S. Cl. .......................................................... 345/418
[58] Field of Search .................................... 345/418, 419, 345/420, 421, 422, 423, 424, 524

[56] References Cited

U.S. PATENT DOCUMENTS 5,428,744   6/1995   Webb et al. .............................. 345/524
5,671,342   9/1997   Miller et al. ............................ 345/418
5,675,826   10/1997  Manze et al. .......................... 345/418

*Primary Examiner*—Cliff N. Vo
*Attorney, Agent, or Firm*—Walter G. Sutcliff

[57] ABSTRACT

A method and apparatus for localizing a point within a sector of a physical surface such as an airport surface that is represented by a plurality of line segments. After entering the physical surface representation, a list of polygons is generated wherein each entry in the list of polygons includes a list of constituent line segments. Then, the list of polygons is organized into a binary tree to encode the relative positions of the polygons. With this organized binary tree, the object can be localized within a polygonal sector by dropping a point representing the object down the binary tree to determine which polygon, if any, encloses the point.

18 Claims, 14 Drawing Sheets

FIG.2(a)
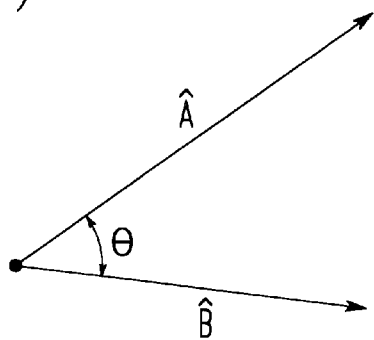
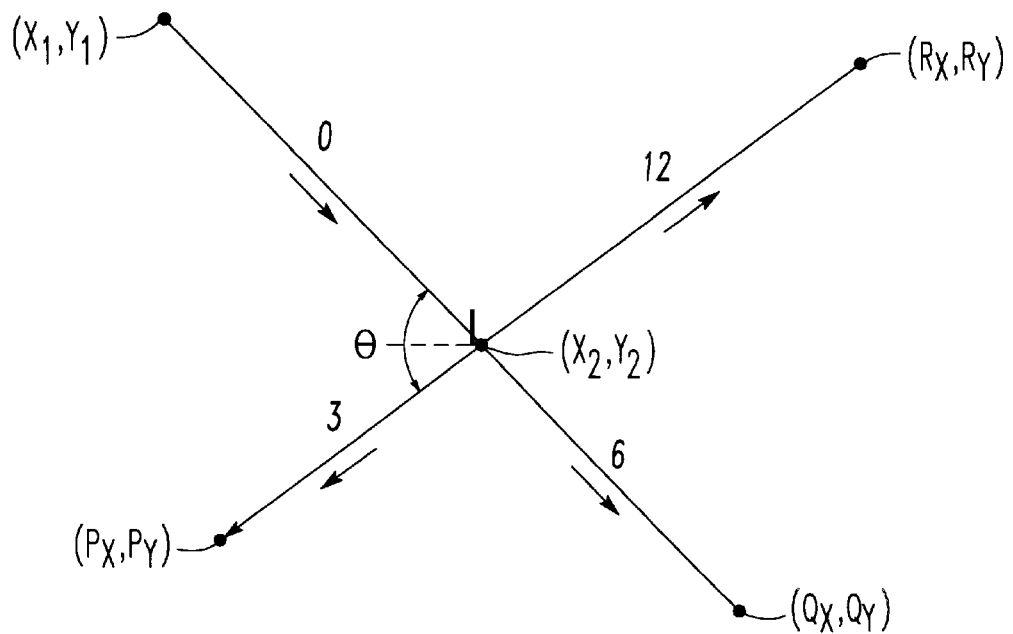
FIG.2(b)

FIG.4(b)
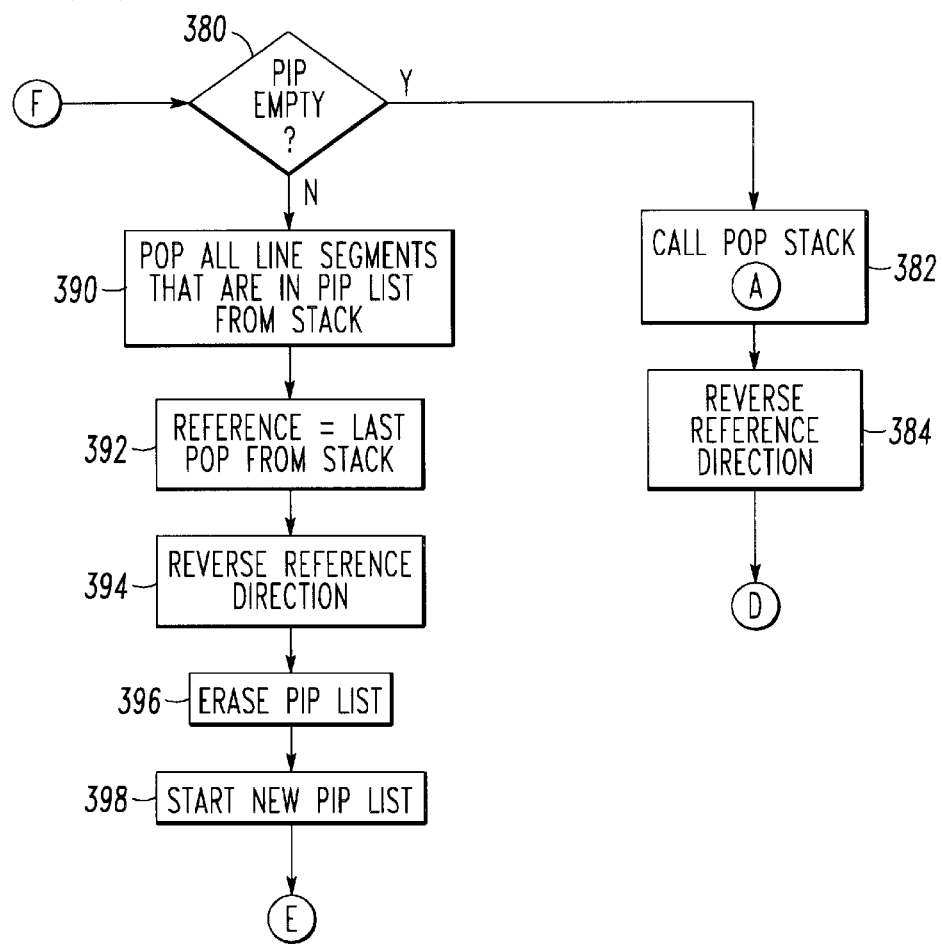
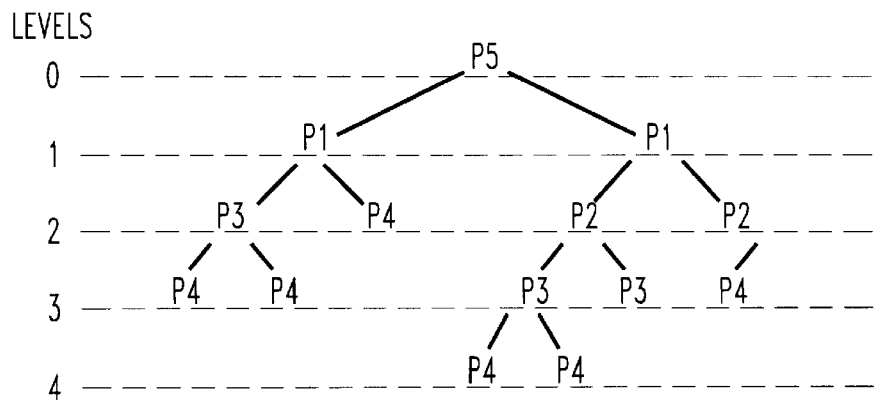
FIG.5

METHOD AND APPARATUS FOR LOCALIZING AN OBJECT WITHIN A SECTOR OF A PHYSICAL SURFACE

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field of the Invention

In general, this invention relates to an efficient method of describing a physical surface and rapidly localizing an object within a sector of the physical surface. More particularly, this general method is applied to describe the surface of an airport and locate an object within a sector of the airport surface.

To control ground traffic at an airport, an air traffic controller needs to have a map of the airport surface and the ability to track any traffic on the ground. This invention aids the air traffic controller in efficiently locating an aircraft within a sector of the airport surface. For example, this invention permits an air traffic controller to determine whether an aircraft has entered an active runway sector.

2. Description of Related Art

Accidents involving aircraft and ground vehicles and aircraft ground collisions can occur at busy airports. More than three times as many near accidents occur on the ground as in the air. In one such accident, an aircraft strayed onto the wrong runway and was struck by a second aircraft, resulting in the loss of life. In another accident, two aircraft collided when one aircraft was cleared to land on an occupied runway. Continuous situation monitoring in fog, snow, at night, and under other adverse conditions, can cause fatigue in human controllers which may lead to a collision between objects on airport surfaces.

Medium-range airport surveillance radar, such as the Automated Radar Terminal System (ARTS) is good for detecting and tracking many aircraft within a large volume of airspace. However, such systems do not provide adequate surveillance coverage for ground-resident objects, including aircraft that are in the taxiing, holding (stopped), takeoff or landing phases of their flight profiles.

Airport Surface Detection Equipment (ASDE) systems can provide high-resolution, short-range, clutter-free, surveillance information on aircraft and ground vehicles, both moving and fixed, located on or near the surface of airport movement and holding areas under all weather and visibility conditions. An ASDE system formats incoming surface detection radar information for a desired coverage area, and presents it to local and ground controllers on high-resolution, bright displays in the airport control tower cab.

In addition, a large, busy airport is an environment having a vast number of possible conflict situations. In such a dynamic environment, the potential for collision between any given aircraft and any one of possibly many ground-residents, and nearby airborne objects may not be recognized until it is too late to avoid the collision. Also, the occurrence of a conflict in one area of the airport may draw controllers' attention away from evolving conflict situations in other areas of the airport.

Such a demanding and potentially hazardous environment demands rapid and efficient localization of objects on the airport surface. In the past, the air traffic controller was forced to manually identify the airport sector containing each object on the ASDE radar so as to resolve potential incursions between the objects on the airport surface. Increasing airport traffic and, in general, an increase on the demands placed on air traffic controllers has made manual object localization techniques obsolete and potentially dangerous.

Thus, there is a need for an automatic method of describing the airport surface such that an object may be rapidly and efficiently localized within a sector of the airport surface.

SUMMARY OF THE INVENTION

The present invention is directed to a method and apparatus for describing an airport surface with discrete sectors and organizing these discrete sectors so that an object may be located within one of the discrete sectors.

More generally, the invention is directed to a method and apparatus for describing a physical surface with polygonal sectors, organizing these polygons and locating a point within one of the polygonal sectors by using the organized polygons.

It is, therefore, an object of the invention to provide a method and apparatus for describing a physical surface by representing the physical surface with a plurality of non-intersecting line segments.

Another object of the invention is to provide a method and apparatus for generating a list of polygons (sectors) wherein each entry in the list of polygons includes a list of line segments and their associated directions which form that polygon.

Another object of the present invention is to organize a list of polygons into a binary tree so as to encode the relative positions of the polygons.

Another object of the invention is to employ a binary tree of polygons to determine which polygon, if any, encloses the object.

Yet another object of the invention is to generate a list of polygons. To achieve this object a method and apparatus are provided, in which each entry in the list of polygons has a corresponding list of line segments and their associated direction, to perform the steps of recursively searching in a search direction for a right-most line segment that shares an end point of a chosen line segment and designating the right-most line segment as the chosen line segment until a duplicate line segment is found or until no right-most line segment is found for the chosen line segment; adding a new polygon to the polygon list when the duplicate line segment is found; reversing the search direction; repeating the recursively searching step and the adding step if no right-most line segment is found for the chosen line segment and iterating the above steps until the list of line segments is exhausted.

Still another object of the invention is to organize a list of polygons into a binary tree. This object is achieved by providing a method for and apparatus programmed to perform the steps of placing a polygon at a root of the binary tree wherein the root polygon includes a first line segment having an associated direction; setting the reference polygon as the root polygon; choosing a next polygon on the list of polygons; recursively adding the chosen polygon as a left leaf of the reference polygon if the left leaf does not already exist and setting the reference polygon of the left leaf of the reference polygon if the left leaf already exists; recursively adding the chosen polygon as a right leaf of the reference polygon if the right does not already exist in setting the reference polygon to the right leaf of the reference polygon if the right leaf already exists and repeating the above steps until the list of polygons is exhausted.

Still another object of the invention is to locate a point within a polygon by traversing a binary tree. This object is achieved by providing a method for and apparatus programmed to perform the steps of (a) setting a root of the binary tree as a reference polygon; (b) recursively determining if the point is to the right of each line segment of the reference polygon until all line segments of the reference polygon have been processed whereupon the point is determined to be in the reference polygon or until the point is determined to be to the left of the current line segment whereupon step (c) is executed; (c) resetting the next reference polygon as a left or right branch of the previous reference polygon depending upon the direction of a first line segment of the previous reference polygon with respect to the point and iterating steps (b) and (c) until the binary tree has been completely traversed wherein no next reference polygon exists as a branch from the previous polygon.

Still another object of the present invention is to describe the surface of an airport, organize this description and localize an object within a sector of the airport surface with this organized description using the above-mentioned methods.

Yet another object of the present invention is to provide an apparatus programmed with the above-described methods such that it describes the surface of an airport, organizes this description and locates an object within a sector of the airport surface with this organized description.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2(a) is a vector diagram for explaining how the right-most line is determined;

FIG. 2(b) is a more specific example drawn from a portion of FIG. 1 for explaining how the right-most line is determined;

FIGS. 4(a) and 4(b) are flow charts for an alternative method for generating a list of polygons from a list of line segments;

FIG. 5 is a binary tree of polygons generated from the line segments shown in FIG. 1;

DETAILED DESCRIPTION OF PREFERRED EMBODIMENTS

Figure 10:
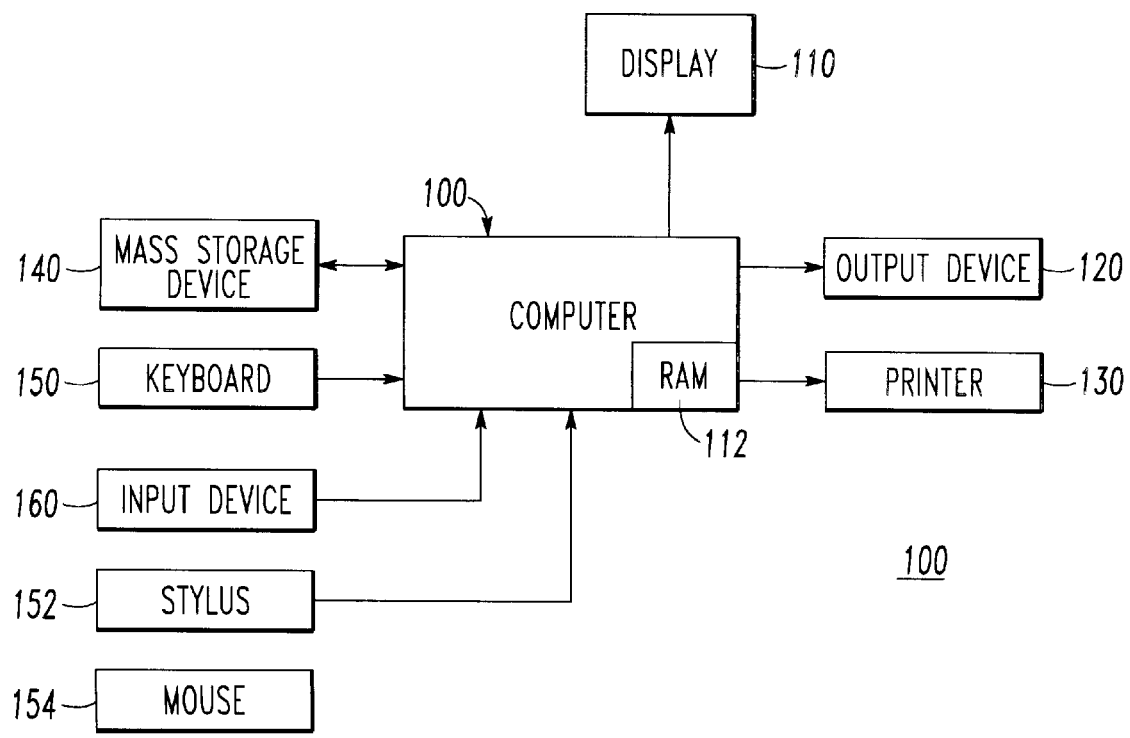
FIG. 10 shows a general purpose computer that can be programmed with the inventive methods.

The first task in locating a point on an airport surface is to build an organized database describing or representing the airport surface. To begin this process, a series of line segments are drawn by an operator. This line segment drawing process can be performed in a variety of manners. For example, an operator may designate the end points of the line segments using a keyboard 150, stylus 152, mouse 154 or other input device 160 as shown in FIG. 10.

When representing the physical surface, every end point of every line segment must touch an end point of at least one other line segment. Furthermore, no line segment may touch another line segment at a point other than an end point. In this way, a closed set of polygons is inscribed on a two-dimensional surface. Furthermore, when drawing these line segments no interior angle of any polygon may measure more than 180°.

Figure 11:
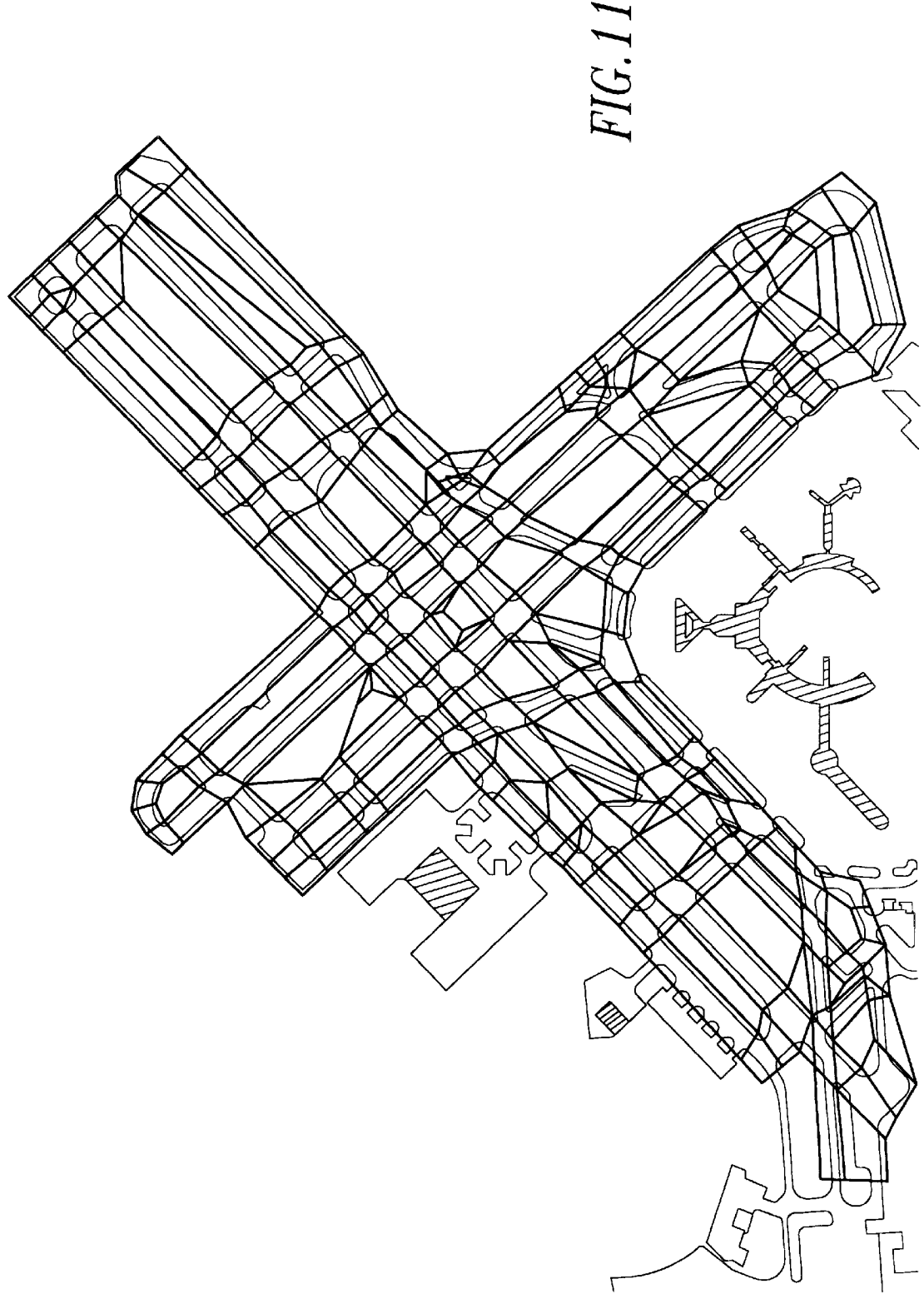
FIG. 11 is an example showing a representation of the San Francisco International Airport surface map and the polygonal sectors resulting therefrom.

FIG. 11 is an example taken from the San Francisco International Airport. The airport surface map is shown in red and the polygonal sectors based on this surface map are shown in blue. These polygonal sectors were determined by employing the above rules for drawing polygons. From this example, it can be seen that no interior angle of any polygon measures more than 180° and that every line segment touches an end point of at least one other line segment.

In this way, a list of line segments can be fed into the computer 100 and stored in, for example, RAM 112 or mass storage device 140. This list of line segments defines a plurality of polygons.

Then, each line segment is assigned a direction. This direction assignment may be performed manually by the operator or automatically by the computer 100. To reduce the amount of data being processed by the computer 100, the direction value may be binary as shown by the directional arrows in FIG. 1. These direction values are relative direction values that are used later in the process as described below.

Figure 1:
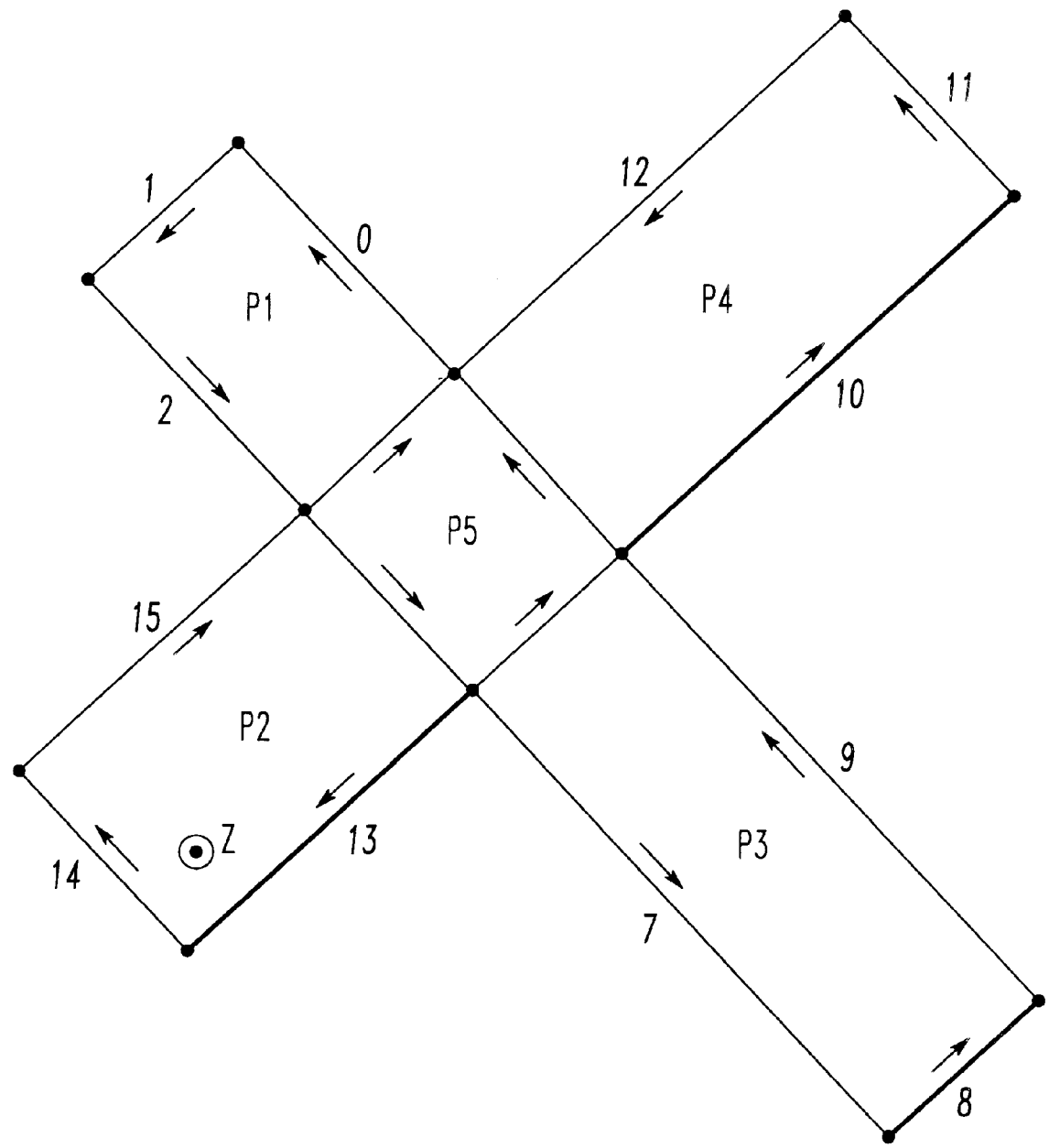
FIG. 1 shows a physical surface that is represented by a plurality of line segments having an associated direction.

FIG. 1 is an example of a two-dimensional surface capable of being processed by the inventive method. FIG. 1 is a simple airport example have two crossed runways. Each line segment (0–15) is inputted to the computer by, for example, manually designating the end points of each line segment. In this way, line segments 0–15 are inputted to the computer 100. Then, an associated direction is assigned to each line segment as shown by the directional arrows in FIG. 1. These associated directions are also called reference directions as will be described below.

Next, a list of polygons is generated from the list of line segments. An exemplary method for generating the list of polygons is set forth in FIGS. 3(a)–(d). Before providing a more detailed description of this exemplary polygon list generation method, an overview of this method will be described.

To generate a list of polygons, the method begins with one of the end points of an arbitrary, first line segment. The algorithm then searches for all line segments that share this end point. For each of these line segments, a cross product is performed with the first line segment using the common end point as the vertex of the angle. The right-most line segment is selected by choosing the line segment that forms the smallest positive angle with respect to the first line segment.

The chosen line segment then takes the place of the first line segment and the process is repeated using the other end point of the new first line segment. This process continues until either (a) a duplicate line segment is found meaning that the process has finished enclosing a polygon, (b) there is no right-most line segment or (c) the right-most line segment found has already been found to be part of two polygons.

In case (a), the polygon is added to the list of found polygons. Then the direction of the last line segment is reversed (i.e., the selected end point becomes the one not last used) and the process continues.

In case (b), the process proceeds by reversing the search direction and attempting to enclose a polygon in the reverse direction. In case (c), the process empties a polygon in progress list, reverses the search direction, and attempts to find a new polygon as will be described in more detail below.

The above description is a general overview of the method of generating a list of polygons from the list of line segments. The terms used in this overview description are more particularly defined in the detailed description of the preferred embodiment set forth below.

The preferred embodiment for generating the list of polygons is set forth in the flow charts appearing in FIGS. 3(a)–(d). These flow charts will now be described in detail.

Figure 3A:
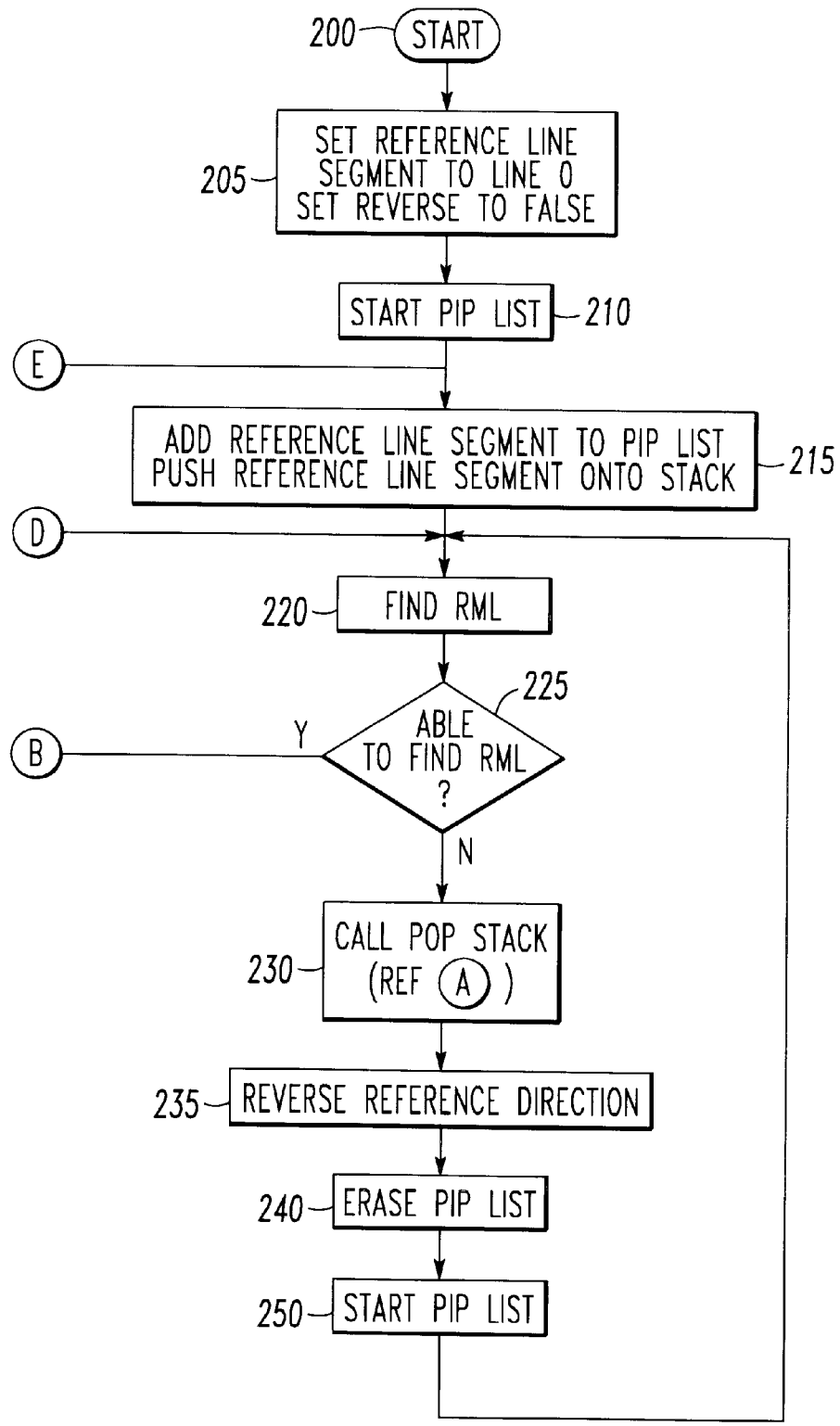
FIGS. 3(a), 3(b), 3(c), and 3(d) are flow charts describing an exemplary method for generating a list of polygons from a list of line segments.

The method of generating a list of polygons as shown in FIG. 3(a) begins with step 200. At 205 the method sets a reference line segment to the first line segment (line 0) in the list of line segments and sets the reverse flag to false. The reference line segment is a label which is used to designate the current or chosen line segment. Although the algorithm begins with line zero, this choice is arbitrary. The reverse flag corresponds to the direction associated with each line segment. To simplify processing, the direction flag is a binary value.

Next, step 210 starts the polygon-in-progress list (PIP list). This PIP list will keep track of line segments potentially belonging to the polygon-in-progress.

Step 215 adds the reference line segment to the PIP list. In other words, the method assumes the reference line segment is one of the line segments of the polygon-in-progress. Step 215 also pushes the reference line segment onto a stack.

Step 220 then finds the right-most line segment (RML) with respect to the reference line segment. More particularly, the algorithm begins with one of the end points of the reference line segment and searches for all line segments that share this end point.

As will be described in the example below, the method begins with line segment zero as the reference line segment and in step 220 attempts to find the right-most line segment with respect to (line segment zero, reverse zero). The end point that is chosen for line segment zero is the end point to which the directional arrow points towards. This end point is common only to line segment one. Thus, a test is then made as to whether line segment one is the right-most line segment with respect to (line segment zero, reverse zero).

Because line segment (1,0) is not to the right of line segment (0,0), the direction of line segment zero is reversed resulting in a reference line segment of (0,1). This reversal process will be will be described below in relation to step 235 and FIG. 3(a).

The notation (line zero, reverse zero) or, more simply (0,0), corresponds to line segment zero having the reverse direction flag set to false.

FIG. 2(a) shows general vectors $\hat{A}$ and $\hat{B}$ and angle $\theta$ therebetween for the purpose of describing the method of finding the right-most line segment. Although the above-description speaks in terms of line segments and their associated direction, it will be understood that a line segment with a direction is equivalent to a vector.

The dot product is quite useful in finding the right most line (RML). The general equation for a dot product is:

$$\hat{A} \cdot \hat{B} = AB \cos \theta = AxBx + AyBy$$

solving for $\theta$ results in:

$$\theta = \cos^{-1}\left[\frac{\hat{A} \cdot \hat{B}}{AB}\right]$$

by knowing that:

$$AB = \sqrt{(Ax^2 + Ay^2)(Bx^2 + By^2)}$$

and substituting in the above equations results in:

$$\theta = \cos^{-1}\left[\frac{(AxBx + AyBy)}{\sqrt{(Ax^2 + Ay^2)(Bx^2 + By^2)}}\right]$$

As an illustrative example, this general equation is applied the particular example shown in FIG. 2(b) where the reference line segment is (line 0, reverse 1). More particularly,
where (Ax,Ay)=((X2−X1),(Y2−Y1))
and (Bx,By)=((PX−X2),(PY−Y2)) substituting these values into the above equations results in:

$$\theta = \cos^{-1}\left[\frac{(X2 - X1)(PX - X2) + (Y2 - Y1)(PY - Y2)}{\sqrt{[(X2 - X1)^2 + (Y2 - Y1)^2][(PX - Y2)^2 + (PY - Y2)^2]}}\right]$$

Because the reference line segment (line zero, reverse one) also shares an end point (X2, Y2) with line segments 3, 6 and 12, the algorithm also calculates $\theta$ for these line segments using points (PX,PY), (QX, QY) and (RX, RY) respectively. Then, the smallest angle $\theta$ is chosen as the right-most line segment. In this case, the angle $\theta$ between the reference line segment (line zero, reverse one) and line segment 3 forms the smallest angle $\theta$. Thus, the line segment (line three, reverse one) is the right-most line segment with respect to (line zero, reverse one).

Conceptually, line segment three, reverse one should be the right-most line segment with respect to line segment zero, reverse one. By pretending that one is standing at (X2, Y2) facing in the indicated direction of line segment zero on FIG. 2(b) the right-most line segment would be line segment 3, reverse one. The above-described mathematical procedure formalizes this concept.

After determining the right-most line segment in step 220 the method proceeds to step 225. Step 225 is a decision block which tests the ability of step 220 to find a right-most line for the reference line segment. One way to test for this condition is whether any θ can be found which is less than or equal to 180°. In more formal terms, if all values θ found in step 220 are such that θ>180° then there is no right-most line for the reference line segment.

If no right-most line segment is found in step 225, then the method proceeds to step 230. If there is a right-most line, then the method proceeds to point B (step 400) as shown in FIG. 3(c).

Conceptually, the ability to find a right-most line segment corresponds to a successful progression around a polygon in the clockwise direction. As will be described later, if the method continues to find right-most line segments then the method is successfully identifying successive line segments that constitute a polygon.

On the other hand, the inability to find a right-most line segment conceptually corresponds to the inability to successively trace (in a clockwise direction) the line segments which constitute a polygon. For example, starting with line segment zero, reverse zero in FIG. 1 and attempting to trace a polygon in the clockwise direction will not meet with success. Thus, the algorithm must proceed in a different direction to trace a polygon as will be described hereinafter.

If Step 225 does not find a right-most line for the reference line segment, then the flow proceeds to Step 230. Step 230 calls the pop-stack routine (Reference Character A) as shown in FIG. 3(b).

Figure 3B:
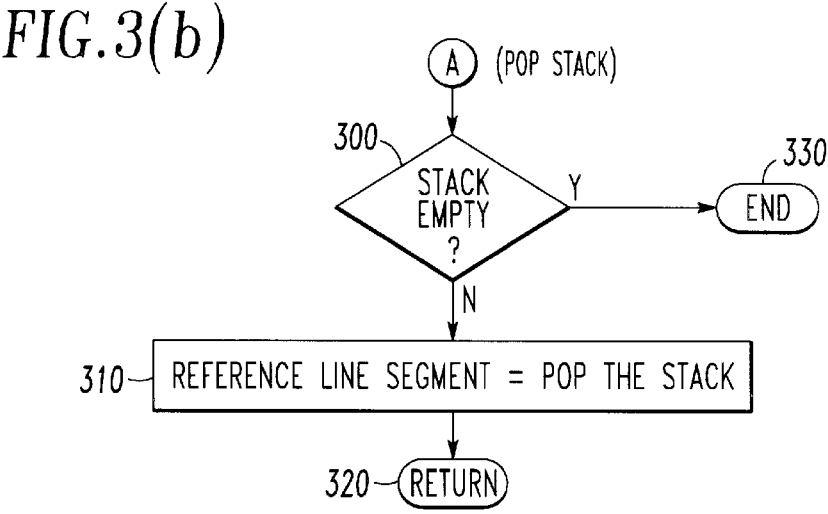
Figure 3C:
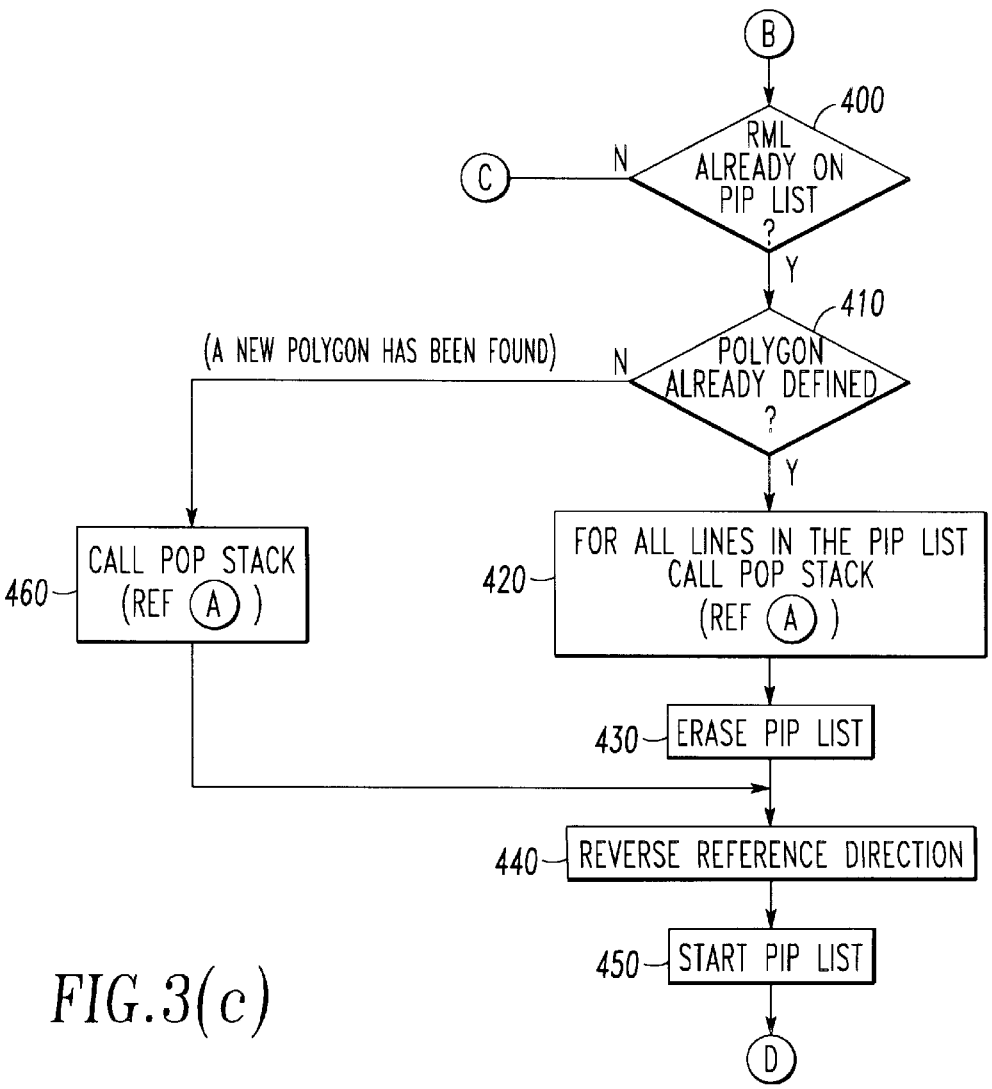
Figure 3D:
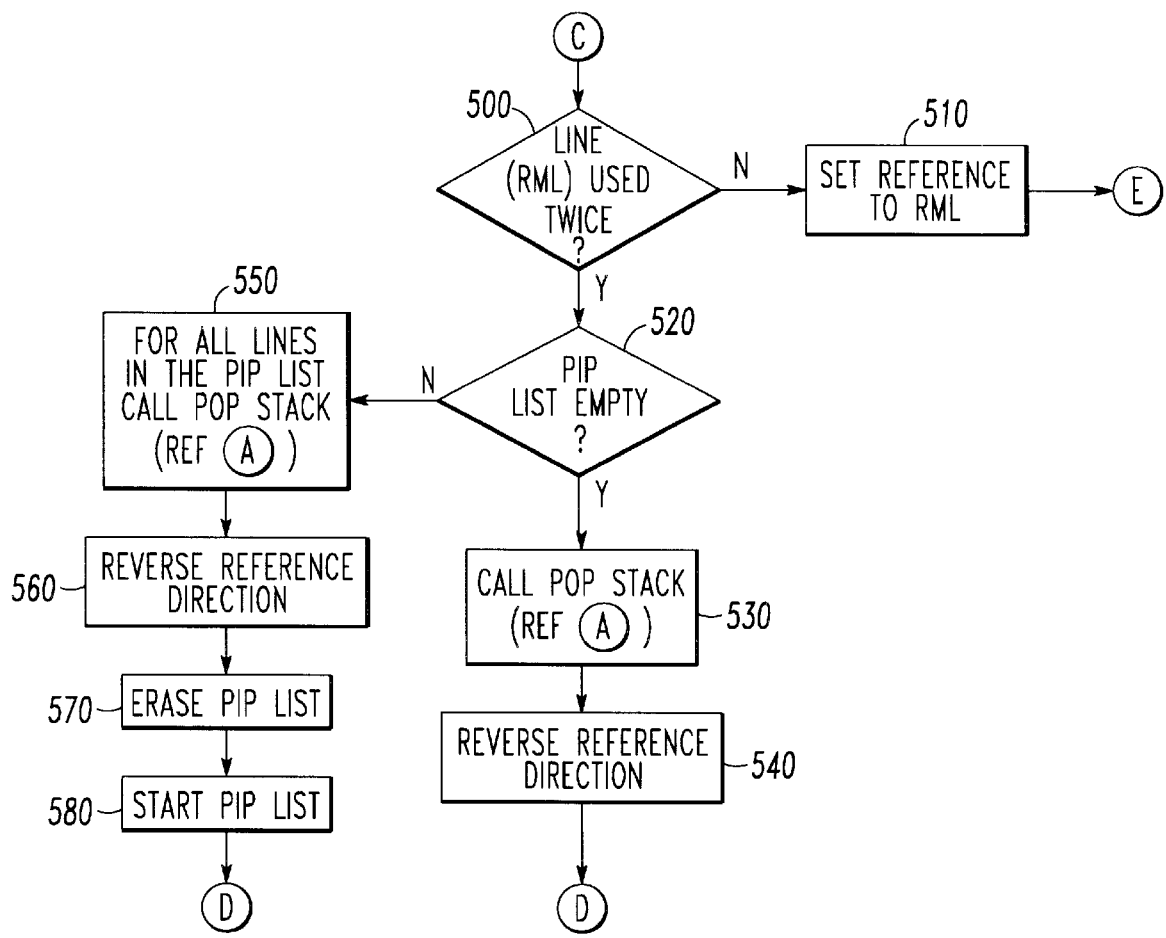

The pop-stack routine A shown in FIG. 3(b) begins with Step 300 which checks to see if the stack is empty. If the stack is empty, then the method is completed. If the stack is not empty, then the method proceeds to Step 310 where the reference line segment is reset to the line segment popped from the stack. In other words, the reference line segment equals the line segment popped from the stack. Step 320 of the pop-stack routine then returns. In this case, the return is to Step 230. The method then proceeds to step 235.

Step 235 reverses the reference direction of the reference line segment. This permits the algorithm to proceed in a different search direction and attempt to trace a polygon in that opposite search direction as will be described hereinafter.

Then, Step 240 is performed which erases the PIP list. The inability to find a right-most line conceptually corresponds to the inability to successfully trace (in a clockwise direction) the line segments which constitute a polygon. Thus, the polygon in progress is invalid and the PIP list must be cleared.

Then, a new PIP list is started at step 250. The method then loops back to step 220 in an attempt to find the right-most line for the reference line segment. The above steps have now reset this reference line segment as described above. Thus, it is now possible to trace a new polygon as described above.

If step 225 of the algorithm is able to find a right-most line (corresponding to the ability to at least partially trace a polygon in the clockwise direction), then the method proceeds to reference character B in FIG. 3(c) (step 400).

Step 400 (shown in FIG. 3 (c)) is a decision block which tests whether the right-most line is already on the polygon-in-progress list. In other words, has the algorithm successfully traced entirely around a polygon such that the right-most line is already included on the polygon-in-progress list. If so, then the method has successfully identified a complete polygon and proceeds to step 410. If not, then the method proceeds to step 500 (reference character C on FIG. 3(d)) which will be described below.

Step 410 is a simple test which determines if the polygon has already been defined. In other words, the PIP list describes polygons which have been previously defined from prior method steps. If the polygon has already been defined, then step 410 directs the method to proceed to step 420. If step 410 determines that the polygon has not been defined, then the method proceeds to step 455 which recognizes that a new polygon has been found and then to step 460 which calls the pop stack routine A shown in FIG. 3(b) and as further described below.

Step 420 basically clears the already defined polygon from the stack and PIP list. More particularly, step 420 calls the pop stack routine (reference character A as shown in FIG. 3(b)) for all lines in PIP list. In other words, all line segments that are in the PIP list are popped from the stack according to the pop stack routine A as shown in FIG. 3(b).

The pop stack routine A shown in FIG. 3(b) begins with step 300 which checks to see if the stack is empty. As will be described later, if the stack is empty, then the method is completed. If the stack is not empty, then the method proceeds to step 310 where the reference line segment is reset to the line segment popped from the stack. In other words, the reference line segment equals the line segment popped from the stack.

Step 320 of the pop stack routine then returns. In this case, the return is to step 420. The method then proceeds to step 430.

In step 430, the polygon-in-progress list is erased. In other words, because the polygon has already been defined, the polygon-in-progress is reset by erasing all entries therein.

Then, step 440 is executed which reverses the reference direction. In this case, because the polygon has already been defined the method must proceed to look in the opposite direction in an attempt to trace a new polygon.

Next, step 450 is executed which starts a new polygon-in-progress list. Then, the method skips to point D shown in FIG. 3(a) wherein the right-most line segment is found in step 220 as described above. In this case, the last line segment popped from the stack is the reference line segment as dictated by step 420 and the reference direction is reversed. For this reference line segment, step 220 then attempts to find the right-most line segment as described above.

Going back to step 410 (where the newly found polygon has not already been defined), the method has successfully identified a new polygon. In other words, a polygon-in-progress list has been generated until the right-most line segment is already on the polygon-in-progress list which results in the identification of a complete polygon. If this polygon has not already been defined as tested in step 410, then a new polygon has been identified as shown in step 455 and the method proceeds to step 460. Step 460 calls the pop stack routine (Ref. A) shown in FIG. 3(b) and described above. Because the top of the stack contains the twice-identified line segment which denotes the positive identification of a complete polygon, the stack must be popped so that the reference line segment is not this twice-identified line segment, but instead the line segment preceding the twice-identified line segment.

After returning from the pop stack routine called in step 460, the method proceeds to step 440 which reverses the reference direction. In this case, the method has positively identified a new polygon and the method must then search for a different polygon in the opposite direction (searching in the same direction would reidentify the new polygon just identified by the method).

Then, the method proceeds to step 450 which restarts the polygon-in-progress list and returns to point D as shown in FIG. 3(a) to execute the step 220 which finds the right-most line for the reference line segment.

Going back to step 400 wherein a test is made for whether the right-most line segment is already on the polygon-in-progress list. If this test is negative and the right-most line segment is not already on the polygon-in-progress list, then the method proceeds to step 500. Conceptually, this step corresponds to the continued clockwise tracing of a polygon all of whose line segments have not been completely identified yet.

Step 500 is a decision block which tests whether the right-most line segment has already been used twice. In other words, is the current line segment (RML) already been used in two polygons. In other words, any given line segment may only be part of, at most, two polygons. If the RML has not already been used twice, then the method is continuing to successfully trace around a polygon in the clockwise direction. Thus, the method proceeds to step 510.

Step 510 sets the reference line segment to the right-most line segment and then proceeds to point E in FIG. 3(a) which pushes the reference line segment onto the stack in step 215 and adds the reference line segment to the polygon-in-progress list. The method continues with a test for the next right-most line in step 220 as described above.

If step 500 determines that the right-most line has already been used twice, then the method proceeds to step 520. A positive result for this test corresponds to the case in which two polygons previously identified containing the right-most line segment. Thus, the right-most line segment cannot be part of a new polygon and the PIP list and stack must be appropriately reset so as to begin a search for a new polygon.

Step 520 tests whether the polygon-in-progress list is empty. If the PIP list is empty, then proceed to step 530. If the polygon-in-progress list is not empty, then proceed to step 550.

Step 530 calls the pop stack routine (Ref. A) shown in FIG. 3(b) to pop the stack and reset the reference line segment to this pop.

Then, step 540 is executed which reverses the reference direction. In other words, the algorithm has run across a line segment (RML) that has already been identified as being part of two polygons. Thus, the algorithm must back up a step and reverse the search direction to be able to identify a new polygon. The method then proceeds to point D in FIG. 3(a) which executes step 220 to find a right-most line segment for the reference line segment.

If step 520 determines that the PIP list is not empty, then step 550 is executed. This case corresponds to the partial identification of a polygon wherein the PIP list is partially completed and then it is discovered that the right-most line segment has already been used twice in two other polygons. In this case, the PIP list and stack must be cleared as will be described below.

Step 550 calls the pop stack routine (Ref. A shown in FIG. 3(b)) for all lines in the PIP list. In other words, the pop stack routine A is called recursively for all lines that appear in the PIP list to successively pop the stack until it is clear of all line segments that were in the PIP list.

Next, step 560 is executed which reverses the reference direction to enable the identification of a different polygon.

Next, step 570 is performed which erases the PIP list. This step clears the PIP list so that it may keep track of the next polygon to be identified.

Next, step 580 starts a new PIP list. Then the method proceeds to point D shown in FIG. (a) which executes step 220 to find the right-most line segment of the reference line segment.

The following is a particular example which illustrates the operation of the method as described in FIGS. 3(a)–(d). This particular example generates a list of polygons from the line segments defined in FIG. 1. The notation (line x, reverse y) is shorthand notation. Line x refers to the line segments shown in FIG. 1. Reverse y refers to the direction of each line segment. A reverse value of zero (false) indicates that the direction being used is the direction drawn on FIG. 1. A reverse value of one (true) indicates that the direction being used is opposite to the direction drawn on FIG. 1.

Furthermore, the term "reference" is shorthand for reference line segment. To further simplify this example, each step performed by the inventive method is not necessarily listed below.

Set reference (line 0, reverse 0)
Start a new PIP list (#0)
Add (line 0, reverse 0) to the PIP list
RML line not found for reference (line 0, reverse 0)
Reference=pop stack and reverse direction (line 0, reverse 1)
Erase the PIP list (#0)
Start a new PIP list (#0)
RML (line 3, reverse 1) found for reference (line 0, reverse 1)
RML becomes new reference (line 3, reverse 1)
Add (line 3, reverse 1) to the PIP list
RML (line 2, reverse 1) found for reference (line 3, reverse 1)
RML becomes new reference (line 2, reverse 1)
Add (line 2, reverse 1) to the PIP list
RML (line 1, reverse 1) found for reference (line 2, reverse 1)
RML becomes new reference (line 1, reverse 1)
Add (line 1, reverse 1) to the PIP list
RML (line 1, reverse 1) found for reference (line 1, reverse 1)
RML becomes new reference (line 0, reverse 1)
Add (line 0, reverse 1) to the PIP list
RML (line 3, reverse 1) found for reference (line 0, reverse 1)
RML already on PIP list
New polygon found line segments:
  (line 3, reverse 1)
  (line 2, reverse 1)
  (line 1, reverse 1)
  (line 0, reverse 1)
Reference=pop stack (line 0, reverse 1)
Reverse reference (line 0, reverse 0)
Start a new PIP list (#1)
RML line not found for reference (line 0, reverse 0)
Reference=pop stack and reverse direction (line 1, reverse 0)
Erase the PIP list (#1)
Start a new PIP list (#1)
RML line not found for reference (line 1, reverse 0)
Reference=pop stack and reverse direction (line 2, reverse 0)
Erase the PIP list (#1)
Start a new PIP list (#1)
RML (lie 15, reverse 1) found for reference (line 2, reverse 0)
RML becomes new reference (line 15, reverse 1)
Add (line 15, reverse 1) to the PIP list RML line not found for reference (line 15, reverse 1)
Reference=pop stack and reverse direction (line 15, reverse 0)
Erase the PIP list (#1)
Start a new PIP list (#1)
RML (line 4, reverse 0) found for reference (line 15, reverse 0)
RML becomes new reference (line 4, reverse 0)
Add (line 4, reverse 0) to the PIP list
RML (line 13, reverse 0) found for reference (line 4, reverse 0)
RML becomes new reference (line 13, reverse 0)
Add (line 13, reverse 0) to the PIP list
RML (line 14, reverse 0) found for reference (line 13, reverse 0)
RML becomes new reference (line 14, reverse 0)
Add (line 14, reverse 0) to the PIP list
RML (line 15, reverse 0) found for reference (line 14, reverse 0)
RML becomes new reference (line 15, reverse 0)
Add (line 15, reverse 0) to the PIP list
RML (line 4, reverse 0) found for reference (line 15, reverse 0)
RML already on PIP list
New polygon found line segments:
   (line 4, reverse 0)
   (line 13, reverse 0)
   (line 14, reverse 0)
   (line 15, reverse 0)
Reference pop stack (line 15, reverse 0)
Reverse reference (line 15, reverse 1)
Start a new PIP list (#2)
RML line not found for reference (line 15, reverse 1)
Reference=pop stack and reverse direction (line 14, reverse 1)
Erase the PIP lit (#2)
Start a new PIP list (#2)
RML line not found for reference (line 14, reverse 1)
Reference=pop stack and reverse direction (line 13, reverse 1)
Erase the PIP list (#2)
Start a new PIP list (#2)
RML (line 7, reverse 0) found for reference (line 13, reverse 1)
RML becomes new reference (line 7, reverse 0)
Add (line 7, reverse 0) to the PIP list
RML line not found for reference (line 7, reverse 0)
Reference=pop stack and reverse direction (line 7, reverse 1)
Erase the PIP list (#2)
Start a new PIP list (#2)
right-most (line 5, reverse 0) found for reference (line 7, reverse 1)
RML becomes new reference (line 5, reverse 0)
Add (line 5, reverse 0) to the PIP list
RML (line 9, reverse 1) found for reference (line 5, reverse 0)
RML becomes new reference (line 9, reverse 1)
Add (line 9, reverse 1) to the PIP list
RML (line 8, reverse 1) found for reference (line 9, reverse 1)
RML becomes new reference (line 8, reverse 1)
Add (line 8, reverse 1) to the PIP list
RML (line 7, reverse 1) found for reference (line 8, reverse 1)
RML becomes new reference (line 7, reverse 1)
Add (line 7, reverse 1) to the PIP list
RML (line 5, reverse 0) found for reference (line 7, reverse 1)
RML already on PIP lit
New polygon found line segments:
   (line 5, reverse 0)
   (line 9, reverse 1)
   (line 8, reverse 1)
   (line 7, reverse 1)
Reference=pop stack (line 7, reverse 1)
Reverse reference (line 7, reverse 0)
Start a new PIP list (#3)
RML line not found for reference (line 7, reverse 0)
Reference=pop stack and reverse direction (line 8, reverse 0)
Erase the PIP list (#3)
Start a new PIP list (#3)
RML line not found for reference (line 8, reverse 0)
Reference=pop stack and reverse direction (line 9, reverse 0)
Erase the PIP list (#3)
Start a new PIP list (#3)
RML (line 10, reverse 0) found for reference (line 9, reverse 0)
RML becomes new reference (line 10, reverse 0)
Add (line 10, revere 0) to the PIP list
RML line not found for reference (line 10, reverse 0)
Reference=pop stack and reverse direction (line 10, reverse 1)
Erase the PIP list (#3)
Start a new PIP list (#3)
RML (line 6, reverse 0) found for reference (line 10, reverse 1)
RML becomes new reference (line 6, reverse 0)
Add (line 6, reverse 0) to the PIP list
right-most (line 12, reverse 1) found for reference (line 6, reverse 0)
RML becomes new reference (line 12, reverse 1)
Add (line 12, reverse 1) to the PIP list
RML (line 11, reverse 1) found for reference (line 12, reverse 1)
RML becomes new reference new reference (line 11, revere 1)
Add (line 11, reverse 1) to the PIP list
RML (lie 10, reverse 1) found for reference (line 11, reverse 1)
RML becomes new reference (line 10, reverse 1)
Add (line 10, reverse 1) to the PIP list
RML (line 6, reverse 0) found for reference (line 10, reverse 1)
RML already on PIP list
New polygon found line segments:
   (line 6, reverse 0)
   (line 12, reverse 1)
   (line 11, reverse 1)
   (line 10, reverse 1)
Reference=pop stack (line 10, reverse 1)
Reverse reference (line 10, reverse 0)
Start a new PIP list (#4)
RML line not found for reference (line 10, reverse 0)
Reference=pop stack and reverse direction (line 11, reverse 0)
Erase the PIP list (#4)
Start a new PIP list (#4)
RML line not found for reference (line 11, reverse 0)
Reference=pop stack and reverse direction (line 12, reverse 0)
Erase the PIP list (#4)
Start a new PIP list (#4)
RML (line 0, reverse 0) found for reference (line 12, revere 0)

RML becomes new reference (line 0, reverse 0)
Add (line 0, reverse 0) to the PIP list
RML line not found for reference (line 0, reverse 0)
Reference=pop stack and reverse direction (line 0, reverse 1)
Erase the PIP list (#4)
Start a new PIP list (#4)
RML (line 3, reverse 1) found for reference (line 0, reverse 1)
RML becomes new reference (line 3, reverse 1)
Add (line 3, reverse 1) to the PIP list
RML (line 2, reverse 1) found for reference (line 3, reverse 1)
RML becomes new reference (line 2, reverse 1)
Add (line 2, reverse 1) to the PIP list
RML (line 1, reverse 1) found for reference (line 2, reverse 1)
RML becomes new reference (line 1, reverse 1)
Add (line 1, reverse 1) to the PIP list
RML (line 0, reverse 1) found for reference (line 1, reverse 1)
RML becomes new reference (line 0, reverse 1)
Add (line 0, reverse 1) to the PIP list
RML (line 3, reverse 1) found for reference (line 0, reverse 1)
RML already on PIP list
Polygon already found=pop line segments from stack . . .
  . . . Reference=pop stack (line 0, reverse 1)
  . . . Reference=pop stack (line 1, reverse 1)
  . . . Reference=pop stack (line 2, reverse 1)
  . . . Reference=pop stack (line 3, reverse 1)
Erase the PIP list (#4)
Reverse reference (line 3, reverse 0)
Start a new PIP list (#4)
RML (line 6, reverse 1) found for reference (line 3, reverse 0)
RML becomes new reference (line 6, reverse 1)
Add (line 6, reverse 1) to the PIP list
RML (line 5, reverse 1) found for reference (line 6, reverse 1)
RML becomes new reference (line 5, reverse 1)
Add (line 5, reverse 1) to the PIP list
RML (line 4, reverse 1) found for reference (line 5, reverse 1)
RML becomes new reference (line 4, reverse 1)
Add (line 4, reverse 1) to the PIP list
RML (line 3, reverse 0) found for reference (line 4, reverse 1)
RML becomes new reference (line 3, reverse 0)
Add (line 3, reverse 0) to the PIP list
RML (line 6, reverse 1) found for reference (line 3, reverse 0)
RML already on PIP list
New polygon found line segments:
  (line 6, reverse 1)
  (line 5, reverse 1)
  (line 4, reverse 1)
  (line 3, reverse 0)
Reference=pop stack (line 3, reverse 0)
Reverse reference (line 3, reverse 1)
Start a new PIP list (#5)
RML (line 2, reverse 1) found for reference (line 3, reverse 1)
RML becomes new reference (line 2, reverse 1)
Add (line 2, reverse 1) to the PIP list
RML (line 1, reverse 1) found for reference (line 2, reverse 1)
RML becomes new reference (line 1, reverse 1)
Add (line 1, reverse 1) to the PIP list
RML (line 0, reverse 1) found for reference (line 1, reverse 1)
RML becomes new reference (line 0, reverse 1)
Add (line 0, reverse 1) to the PIP list
RML (line 3, reverse 1) found for reference (line 0, reverse 1)
RML already used twice (line 3, reverse 1) . . .
  . . . PIP list is not empty . . .
  . . . Reference=pop stack (line 0, reverse 1)
  . . . Reference=pop stack (line 1, reverse 1)
  . . . Reference=pop stack (line 2, reverse 1)
  . . . Reverse reference (line 2, reverse 0)
Erase the PIP list (#5)
Start a new PIP list (#5)
RML (line 15, reverse 1) found for reference (line 2, reverse 0)
RML becomes new reference (line 15, reverse 1)
Add (line 15, reverse 1) to the PIP lit
RML line not found for reference (line 15, reverse 1)
reference=pop stack and reverse direction (line 15, reverse 0)
Erase the PIP list (#5)
Start a new PIP list (#5)
RML (line 4, reverse 0) found for reference (line 15, reverse 0)
RML already used twice (line 4, reverse 0) . . .
  . . . PIP list is empty . . .
  . . . Reference=pop stack reverse direction (line 4, reverse 0)
RML (line 13, reverse 0) found for reference (line 4, reverse 0)
RML becomes new reference (line 13, reverse 0)
Add (line 13, reverse 0) to the PIP list
RML (line 14, reverse 0) found for reference (line 13, reverse 0)
RML becomes new reference (line 14, reverse 0)
Add (line 14, reverse 0) to the PIP list
RML (line 15, reverse 0) found for reference (line 14, reverse 0)
RML becomes new reference (line 15, reverse 0)
Add (line 15, reverse 0) to the PIP list
RML (line 4, reverse 0) found or reference (line 15, reverse 0)
RML already used twice (line 4, reverse 0) . . .
  . . . PIP list is not empty . . .
    . . . Reference=pop stack (line 15, reverse 0)
    . . . Reference=pop stack (line 14, reverse 0)
    . . . Reference=pop stack (line 13, reverse 0)
    . . . Reverse reference (line 13, reverse 1)
Erase the PIP list (#5)
Start a new PIP list (#5)
RML (line 7, reverse 0) found for reference (line 13, reverse 1)
RML becomes new reference (line 7, reverse 0)
Add (line 7, reverse 0) to the PIP list
RML line not found for reference (line 7, reverse 0)
Reference=pop stack and reverse direction (line 7, reverse 1)
Erase the PIP list (#5)
Start a new PIP list (#5)
RML (line 5, reverse 0) found for reference (line 7, reverse 1)
RML already used twice (line 5, reverse 0) . . .
  . . . PIP list is empty . . .
    . . . Reference=pop stack and reverse direction (line 5, reverse 0)

RML (line 9, reverse 1) found for reference (line 5, reverse 0)
right-most becomes new reference (line 9, reverse 1)
Add (line 9, reverse 1) to the PIP list
RML (line 8, reverse 1) found for reference (line 9, reverse 1)
RML becomes new reference (line 8, reverse 1)
Add (line 8, reverse 1) to the polygon-in-list
RML (line 7, reverse 1) found for reference (line 8, reverse 1)
RML becomes new reference (line 7, reverse 1)
Add (line 7, reverse 1) to the PIP list
RML (line 5, reverse 0) found for reference (line 7, reverse 1)
RML already used twice (line 5, reverse 0) . . .
. . . PIP list is not empty . . .
. . . Reference=pop stack (line 7, reverse 1)
. . . Reference=pop stack (line 8, reverse 1)
. . . Reference=pop stack (line 9, reverse 1)
. . . Reverse reference (line 9, reverse 0)
Erase the PIP list (#5)
Start a new PIP list (#5)
RML (line 10, reverse )) found for reference (line 9, reverse 0)
right-most becomes new reference (line 10, reverse 0)
Add (line 10, reverse 0) to the PIP list
RML line not found for reference (line 10, reverse 0)
Reference=pop stack and reverse direction (line 10, reverse 1)
Erase the PIP list (#5)
Start a new PIP list (#5)
RML (line 6, reverse 0) found for reference (line 10, reverse 1)
RML already used twice (line 6, reverse 0) . . .
. . . PIP list is empty . . .
. . . Reference=pop stack and reverse direction (line 6, reverse 0)
RML (line 12, reverse 1) found for reference (line 6, reverse 0)
RML becomes new reference (line 12, reverse 1)
Add (line 12, reverse 1) to the PIP list
RML (line 11, reverse 1) found for reference (line 12, reverse 1)
RML becomes new reference (line 11, reverse 1)
Add (line 11, reverse 1) to the PIP list
RML (line 10, reverse 1) found for reference (line 11, reverse 1)
RML becomes a new reference (line 10, reverse 1)
Add (line 10, reverse 1) to the PIP list
RML (line 6, reverse 0) found for reference (line 10, reverse 1)
RML already used twice (line 6, reverse 0) . . .
. . . PIP list is not empty . . .
. . . Reference=pop stack (line 10, reverse 1)
. . . Reference=pop stack (line 11, reverse 1)
. . . Reference=pop stack (line 12, reverse 1)
. . . Reverse reference (line 12, reverse 0)
Erase the PIP list (#5)
Start a new PIP list (#5)
RML (line 0, reverse 0) found for reference (line 12, reverse 0)
RML becomes new reference (line 0, reverse 0)
Add (line 0, reverse 0) to the PIP list
RML line not found for reference (line 0, reverse 0)
Reference=pop stack and reverse direction (line 0, reverse 1)
Erase the PIP list (#5)
Start a new PIP list (#5)

Figure 4A:
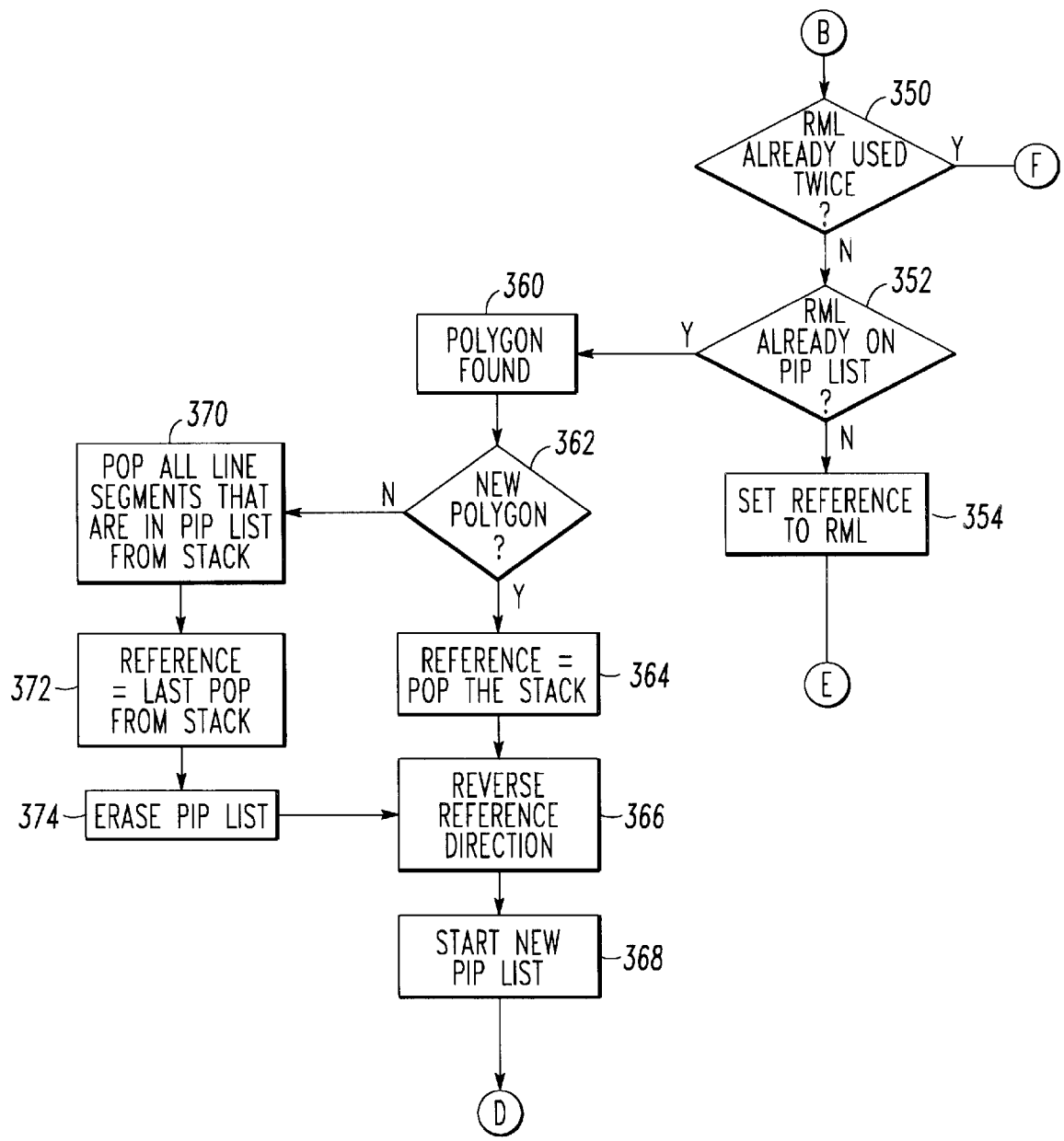

RML (line 3, reverse 1) found for reference (line 0, reverse 1)
RML already used twice (line 3, reverse 1) . . .
. . . PIP list is empty . . .
. . . Reference=pop stack and reverse direction (line 6, reverse 1)
RML (line 5, reverse 1) found for reference (line 6, reverse 1)
RML already used twice (line 5, reverse 1) . . .
. . . PIP list is empty . . .
. . . Reference=pop stack and reverse direction (line 5, reverse 1)
RML (line 4, reverse 1) found for reference (line 5, reverse 1)
RML already used twice (line 4, reverse 1) . . .
. . . PIP list is empty . . .
. . . Reference=pop stack and reverse direction (line 4, reverse 1)
RML (line 3, reverse 0) found for reference (line 4, reverse 1)
RML already used twice (line 3, reverse 0) . . .
. . . PIP list is empty . . .
. . . Reference=pop stack and reverse direction (line 3, reverse 0)
RML (line 6, reverse 1) found for reference (line 3, reverse 0)
RML already used twice (line 6, reverse 1) . . .
. . . PIP list is empty . . .
Stack empty=finished FIGS. 4(a)–(b) are flow charts describing an alternative method of generating the list of polygons. FIGS. 4(a) and 4(b) may be used in place of the flow charts shown in FIGS. 3(c) and 3(d). Because FIGS. 3(a) and 3(b) have already been described above, a further description of these flow charts is unnecessary.

Thus, if step 225 determines that there is no right-most line segment, then the method may proceed to step 350 shown in FIG. 4(a).

Step 350 is a decision block which tests whether the right-most line has already been used twice. If the right-most line has already been used twice, then the method proceeds to step 380 in FIG. 4(b). If the right-most line has not already been used twice, then the method proceeds to step 352.

Step 352 is a decision block which tests whether the right-most line is already on the PIP list.

If the right-most line is not on the PIP list, then step 354 is performed. Step 354 sets the reference line segment to the right-most line. Conceptually, this series of steps continues to proceed around a polygon in the clockwise direction by setting the reference line segment to the right-most line segment. Then the method returns to point E in FIG. 3(a) and step 215 is performed to push the reference line segment onto the stack.

If step 352 determines that the right-most line is already on the PIP list, then the method has found a polygon as in step 360. In other words, the method has traced a polygon completely in a clockwise direction until it finds that the right-most line is already on the PIP list. Thus, in step 360 a polygon has been found.

The method then proceeds to decision block 362 which decides whether the polygon is a new polygon. If step 362 determines that the found polygon is a new polygon, then the method proceeds to step 364.

Step 364 pops the stack and sets the reference line segment to this pop.

Then, step 366 reverses the reference direction so that a new search can be performed for a next polygon.

Next, step 368 is performed which starts a new PIP list for this new search. The method then skips to point D in FIG. 3(*a*) which proceeds to find the right-most line segment for the reference line segment in step 220.

If step 362 determines that the found polygon is not a new polygon, then the found polygon must be cleared from the PIP list and stack so that a different polygon can be search for and identified. Thus, the method then proceeds to step 370. Step 370 pops all line segments that are in the PIP list from the stack. Then, step 372 sets the reference line segment as the last pop from the stack.

Then, step 374 erases the PIP list so that a new polygon can be searched for and identified.

The method then proceeds to step 366 which reverses the reference direction so that a productive search can then be conducted for the next polygon. As described above, the method then proceeds to step 368 which starts a new PIP list. The method then proceeds to point D in FIG. 3(*a*) which executes step 220 to find the right-most line segment.

If step 350 determines that the right-most line segment has already been used twice, then the method proceeds to point F in FIG. 4(*b*) and executes step 380. Conceptually, this situation occurs when the right-most line segment has already been included within two polygons. Because any line segment may only be part of two polygons, the method must reset the stack and PIP when this situation occurs.

In step 380, a decision block is performed which tests whether the PIP list is empty. If the PIP list is empty, then the method proceeds to step 382.

Step 382 calls the pop stack routine (reference A in FIG. 3(*b*)) which is described above.

Next, the method proceeds to step 384 which reverses the reference direction so that a new search can be conducted. Then the method returns to point D in FIG. 3(*a*) to execute step 220 which finds the right-most line segment in the next search.

If the PIP list is not empty as determined by step 380, then the method then proceeds to step 390. Conceptually, this situation occurs when a PIP has determined to be invalid because the right-most line segment has already been used twice and when the PIP list is not empty. Thus, the PIP list and stack must be reset so that a productive search can be conducted.

Step 390 pops all line segments that are in the PIP list from the stack. Thus, the stack is cleared of the invalid PIP.

Step 392 is then conducted which sets the reference line segment as the last pop from the stack. This gives a new starting point for the next search.

Step 394 is then conducted which reverses the reference direction so that a productive search can then be conducted.

Step 396 is then performed which erases the PIP list. Next, step 398 is performed which starts a new PIP list. Steps 396 and 398 reset the PIP list for the next search. Then, the method returns to reference point E in FIG. 3(*a*) and executes step 215 which pushes the reference line segment on the stack. Then, step 220 is executed to find the right-most line segment.

The above-described algorithms take a list of line segments and generates a list of polygons wherein each entry in the list of polygons includes all line segments and their associated direction which constitute that polygon. Furthermore, each polygon also includes a first line segment having an associated direction that can be used to uniquely designate that polygon.

BUILDING A POLYGON TREE FROM THE LIST OF POLYGONS

Figure 6A:
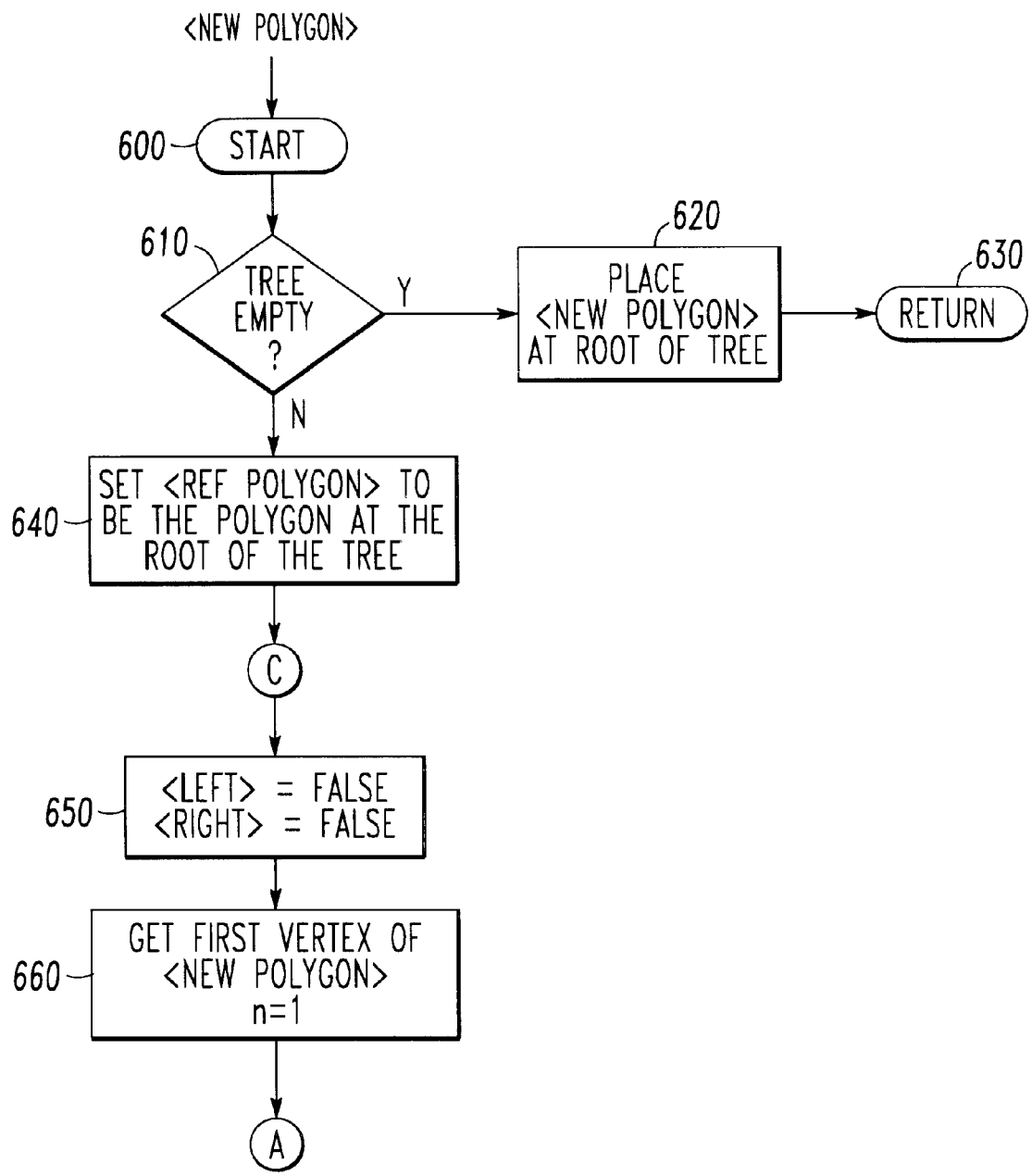
FIGS. 6(a), 6(b) and 6(c) are flow charts describing an exemplary method of organizing a list of polygons into a binary tree.

The following is a general description of the method for transforming the list of polygons into a binary tree. Following this general description, an exemplary method of implementing this general description will be described with reference to FIGS. 5 and 6(*a*)–(*c*).

Once the complete list of polygons is created as per the above described methods, each of the polygons is placed in a binary tree. An example of such a binary tree is shown in FIG. 5.

The position of each polygon in the binary tree is based on whether its first line segment is to the left or to the right of each subsequent polygon in the tree. In other words, after placing the first polygon at the root of the tree, each polygon is dropped down the tree, going to the left or to the right based on the relative position of the subsequent polygon's first line segment until the polygon reaches its resting place at the bottom of the tree. Each resting place is called a leaf of the tree and connections between successive leaves are referred to as branches.

Thus, the binary tree encodes the relative positions of the polygons. In the example shown in FIG. 5, the binary tree encodes the relative positions of polygons P1–P5 into four levels 0–4. The levels are shown using dotted lines as will be described in more detail later.

The flow chart for building the binary tree from the list of polygons is shown in FIGS. 6(*a*)–(*c*). This routine is successively called or performed for each successive polygon in the list of polygons. This flow chart will be described hereinafter in detail.

For each polygon in the list of polygons, the method begins with start step 600.

Then, step 610 tests whether the binary tree is empty. If the binary tree is empty (i.e. the polygon being processed is the very first polygon in the list of polygons), then proceed to step 620.

Step 620 places the new polygon at the root of the binary tree. The procedure is then finished for this polygon. Thus, the procedure returns in step in 630 so that the next polygon on the list of polygons can be processed.

If step 610 determines the tree is not empty (i.e. the polygon being processed is not the first polygon in the list of polygons), then the method proceeds to step 640.

Step 640 sets a reference polygon to be the polygon at the root of the tree. In other words, the method begins a search by starting at the root of the tree. Thus, the reference polygon is set or designated as the root of the binary tree.

Next, the method proceeds to step 650 which initializes two flags: both the left flag and right flag are set to be false. The notation for the left and right flags is <left> and <right>, respectively in FIGS. 6(*a*)–(*c*). The purpose of these flags will become apparent as the method is described in more detail below.

The method then proceeds to step 660 which retrieves a first vertex of the new polygon. As will be recalled from previous discussions, each polygon includes a list of line segments and each line segment is designated by end points. The intersection of two line segments at their end points denotes a vertex of the polygon. Step 660 retrieves the first of these vertices from the new polygon. The method then proceeds to point A in FIG. 6(*b*).

Point A in FIG. 6(*b*) begins with step 700. Step 700 is a decision block which tests vertex n as to whether vertex n is to the right of the first line segment of the reference polygon. If the nth vertex of the new polygon is to the <right> of the first line segment of the reference polygon, then step 710 is performed which sets the flag <right> equal to true.

If the nth vertex is not to the right of the first line segment of the reference polygon or, after step 710 is performed, then the method proceeds to step 720.

Step 720 determines if the nth vertex of the new polygon is to the left of the first line segment of the reference polygon.

If the nth vertex is to the left of the first line segment of the reference polygon, then step 730 is performed which sets the left direction flag <left> equal to true.

If the nth vertex is not to the left of the first line segment of the reference polygon or, after step 730 is performed, then the method proceeds to step 740.

Before proceeding to describe the method further, it is appropriate to define how steps 700 and 720 perform the "to the right" and "to the left" tests. Essentially, each of these steps 700 and 720 finds the direction of a point (the nth vertex of the new polygon) with respect to a line segment (the first line segment of the reference polygon).

To accomplish this task, the first line segment of the reference polygon with its associated direction can be used a line segment vector. Furthermore, the nth vertex can be converted to a vector by using the beginning point of the first line segment of the reference polygon as a starting point for this vector. These vectors can then be used to determine whether the point (nth vertex of the new polygon) is to the left or to the right with respect to the first line segment of the reference polygon.

The following equation derivation and example illustrate the operation of step 700.

To find the direction at a point with respect to a line segment vector, the vector cross product is quite useful. The cross product equation is:

$$\hat{A} \times \hat{B} = (A_y B_z - A_z B_y)\hat{X} + (A_z B_x - A_x B_z)\hat{Y} + (A_x B_y - A_y B_x)\hat{Z}$$

to determine the direction, only the $\hat{Z}$ component is needed. Thus, the direction can be determined using the following equation:

direction = $A_x B_y - A_y B_x$

From this equation for the direction, simple tests can be performed: if direction <0 then point (PX,PY) is to the right of $\hat{A}$ and if direction >0 then point (PX,PY) is to the left of $\hat{A}$.

Figure 7A:
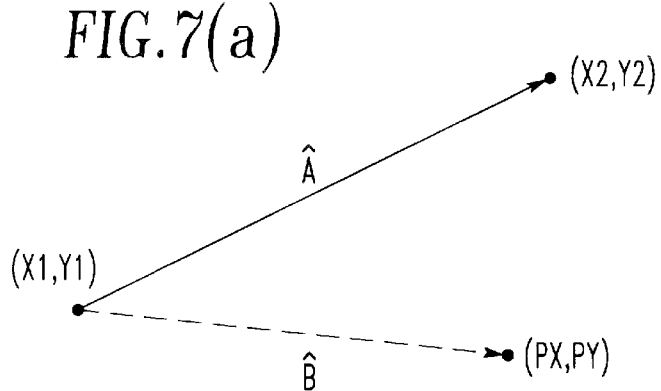
FIG. 7(a) is a vector diagram for explaining the general method for determining whether a point is to the right of a line segment.

FIG. 7(a) is a simple vector diagram for further illustrating the operation of these equations. From FIG. 7(a), it can be determined that:

$$\hat{A} = (X2 - X1)\hat{X} + (Y2 - Y1)\hat{Y}$$

$$\hat{B} = (PX - X1)\hat{X} + (PY - Y1)\hat{Y}$$

substituting results in:

$$\text{direction} = (4 - 0)(1 - 0) - (4 - 0)(3 - 0)$$
$$= 4 - 12$$
$$= -8$$

Figure 7B:
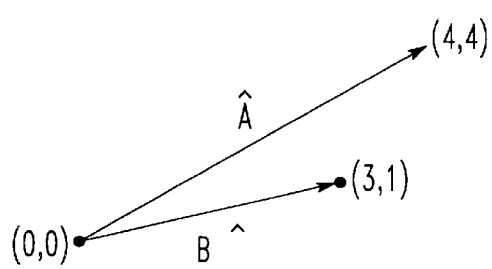
FIG. 7(b) is a more specific example of a vector diagram showing how a point (PX,PY) is to the right of vector A.

Applying the simple test above, results in:
direction <0
Therefore, point (PX,PY)=(3,1) is to the right of $\hat{A}$.
This result is consistent with a conceptual view of FIG. 7(b) where if one imagines standing at the foot of $\hat{A}$ then $\hat{B}$ is to the right.

The above description describes how the nth vertex of the new polygon is determined to be to the right of the first line segment of the reference polygon in step 700. Step 720 operates in a similar manner. As illustrated above, the difference is that if the direction is greater than zero, then point (PX, PY) is to the left of vector $\hat{A}$.

It is to be noted that because a polygon contains a multiple vertices, a polygon may be both to the right and to the left of the first line segment of the reference polygon.

Returning to the main flow of the inventive method, step 740 tests the direction vectors: if the left direction flag <left> or the right direction flag <right> is false then proceed to step 750. If either the left or right <right> direction flag is true then skip to point B in FIG. 6(c).

Figure 6B:
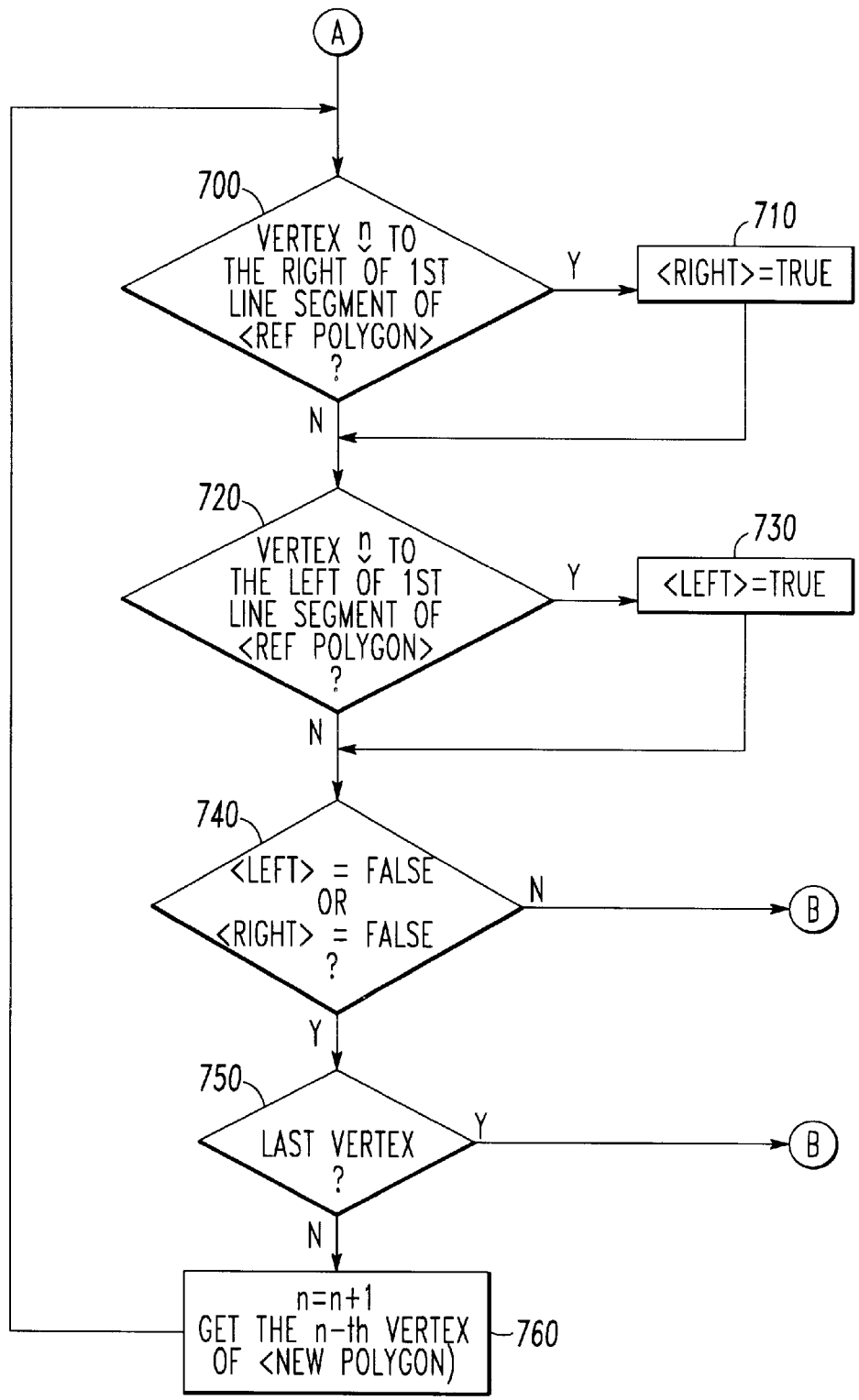
Figure 6C:
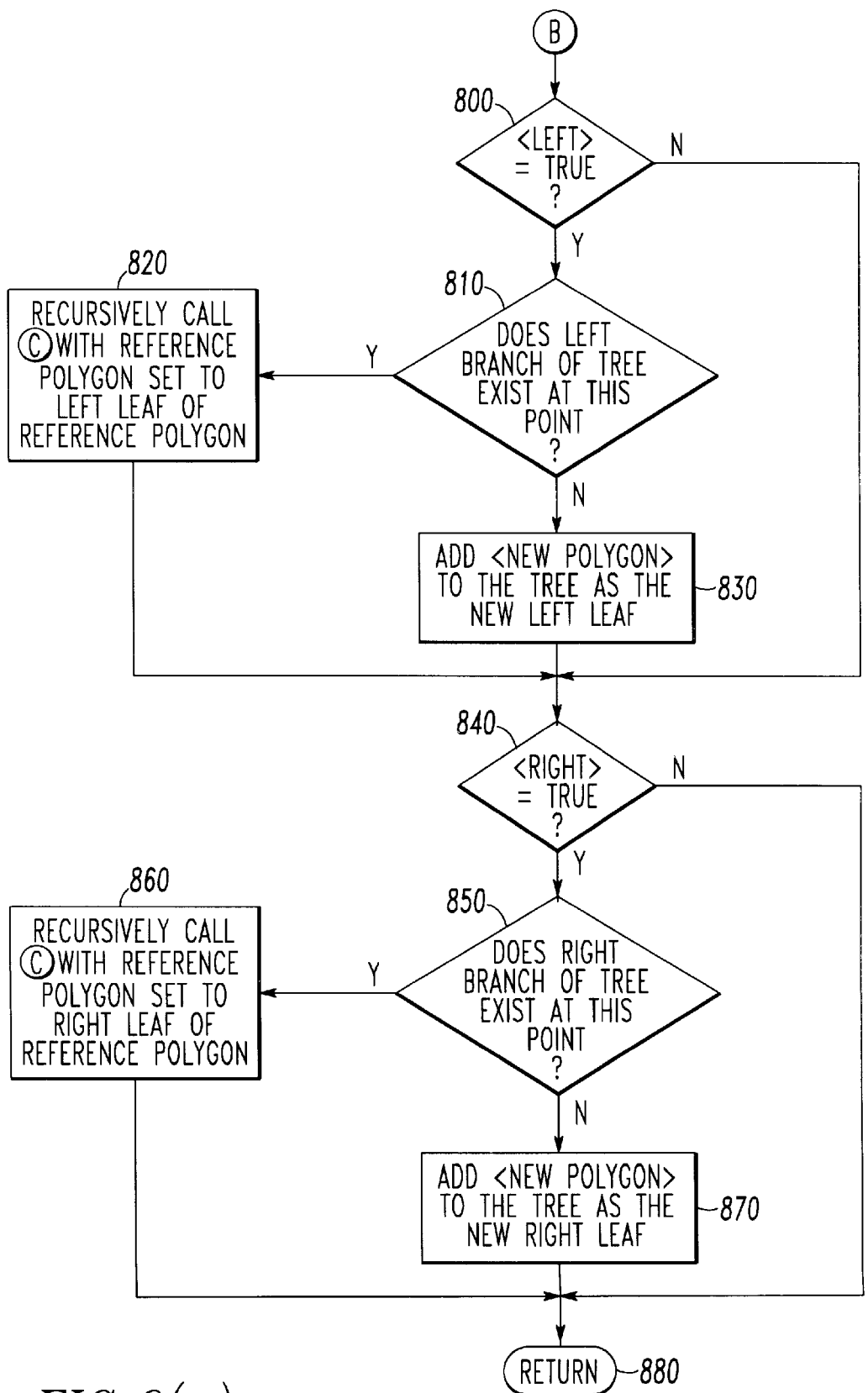

Step 740 is an optimization step which breaks out of the recursive loop shown in FIG. 6(b) when both the left flag <left> and right flag <right> are both true. In other words, it is not necessary to test other vertexes of the new polygon if both the left <left> and right <right> flags are both true. Step 740 may be omitted.

Then, step 750 determines if the last vertex of the new polygon has been processed. If the last vertex has been processed, then the method skips to point B shown in FIG. 6(c) and executes step 800. If the last vertex has not been processed, then the method proceeds to step 760.

Step 760 retrieves the next vertex of the new polygon and begins the loop again at step 700. In other words, the vertex increment counter n is updated by 1 and the recursive loop beginning at step 700 is performed again.

Step 800 tests the left direction flag <left> and branches according to this test. If the left direction flag <left> is true indicating that the new polygon is to the left of the reference polygon, then the method proceeds to step 810.

Step 810 tests whether a left branch of the tree exists at this point. In other words, does the reference polygon already have a left branch leading to a left leaf. If a left branch does exist, then the method proceeds to step 820.

Step 820 is performed when the method is unable to place the new polygon as the left branch of the reference polygon because such a left branch already exists at this point. Step 820 recursively calls routine beginning at point C in FIG. 6(a) with the reference polygon set to the left leaf of the reference polygon.

Point C is shown in FIG. 6(a) and is between steps 640 and 650. In other words, when the method determines that a left branch exists at the reference polygon, the reference polygon is reset to this previously existing left leaf and the method is recursively performed again beginning at step 650. This recursive process will continue until step 810 determines that a left branch does not exist at that point. In this case, a left branch is now available for the placement of the new polygon.

If step 810 determines that a left branch of the tree does not exist at this point, then the method proceeds to step 830.

Step 830 adds the new polygon to the tree as the new left leaf of the reference polygon.

If step 800 determines that the left direction flag <left> is false or after the completion of step 830, the method then proceeds to step 840.

Step 840 tests the right direction flag <right> and branches according to this test. If the right direction flag <right> is true indicating that the new polygon is to the right of the reference polygon, then the method proceeds to step 850.

Step 850 tests whether a right branch of the tree exists at this point. In other words, does the reference polygon already have a right branch leading to a right leaf. If a right branch does exist, then the method proceeds to step 860.

Step 860 is performed when the method is unable to place the new polygon as the right branch of the reference polygon because such a right branch already exists at this point. Step 860 recursively calls routine beginning at point C in FIG. 6(a) with the reference polygon set to the right leaf of the reference polygon.

Point C is shown in FIG. 6(a) and is between steps 640 and 650. In other words, when the method determines that a right branch exists at the reference polygon, the reference polygon is reset to this previously existing right leaf and the method is recursively performed again beginning at step 650. This recursive process will continue until step 850 determines that a right branch does not exist at that point. In this case, a right branch is now available for the placement of the new polygon.

If step 850 determines that a right branch of the tree does not exist at this point, then the method proceeds to step 870.

Step 870 adds the new polygon to the tree as the new right leaf of the reference polygon.

If step 840 determines that the right direction flag <right> is false or after the completion of step 870, the method then proceeds to build the polygon tree with the next polygon from the list of polygons beginning with step 600. This process continues until the list of polygons is exhausted.

Using the above described method for building a binary tree from the list of polygons, the binary tree shown in FIG. 5 can be generated. The binary tree shown in FIG. 5 is the binary tree which results for the polygons generated from the line segments shown in FIG. 1.

For example, polygon P5 is placed at the root of the tree and becomes the reference polygon. Then, polygon P1 is chosen as the new polygon. Polygon P1 is both to the left and to right of polygon P5. Because there are no left or right branches of polygon P5 as of yet, polygon P1 becomes both the left leaf and right leaf of polygon P5.

Next, polygon P2 is set as the new polygon. Beginning with polygon P5 as the reference polygon, it is determined that polygon P2 is to the right of polygon P5. Because there already exists a right branch of polygon P5 (namely polygon P1) the method recursively sets the reference polygon to the right leaf of the reference polygon. Thus, the reference polygon is reset to P1 (the right leaf).

Next, polygon P2 is determined to be both to the left and to the right of reference polygon P1. Because there is no left or right branch of polygon P1 at this point, polygon P2 becomes both a left leaf and right leaf of polygon P1 at this point.

After resetting the reference polygon as root polygon P5, the method continues with polygons P3 and P4. Placing polygon P3 will require recursively resetting the reference polygon as polygon P1 (as above). Placing polygon P3 will also require recursively resetting the reference polygon from polygon P1 to polygon P2 because polygon P1 already has left and right leaves. Lastly, polygon P4 is put in the binary tree. The results of this method are shown in FIG. 5.

Steps 700 and 720 which test whether the nth vertex of the new polygon is to the right or to the left of the first line segment of the reference polygon, may use the same "to the right" and "to the left" tests described previously. In other words, a cross product is performed between the first line segment of the reference polygon and the vector which connects the first end point of the first line segment of the reference polygon to the nth vertex of the new polygon. This cross product, its derivation and application to the "to the left" and the "to the right" tests are more particularly described above.

Choosing the root polygon may be arbitrarily or methodically determined. A user may arbitrarily set this root polygon. Experience shows that the binary tree can be approximately balanced by choosing a root polygon somewhere near the middle of the represented physical surface. For example, the user may want to choose polygon P5 in FIG. 1 as is done with the particular example described herein.

Because the binary tree must be traversed to localize a point within a polygon (described in detail below), it is highly desirable to choose a root polygon that results in a binary tree with minimum depth. The depth of the binar tree is shown in FIG. 5 using horizontal dotted lines designated by depth levels 0–4. In other words, the binary tree as shown in FIG. 5 has five levels 0–4.

The optimum root polygon may also be determined methodically by, for example, a general purpose computer. This methodical process successively chooses each polygon in the list of polygons and builds a binary tree therefrom according to the above-described method. Then, a test is made to determine the depth of the tree by counting the number of levels. After generating binary trees using each of the polygons as the root polygon, the depth of the resulting trees can then be compared. The binary tree having the minimum depth is most desirable because it can be traversed in the least possible time as will be described hereinafter.

Using the above described method, a binary tree of polygons encoding the relative positions of these polygons may be generated. Using this binary tree, a point on the physical surface can be localized within one of these polygons in a rapid and efficient manner as described below.

LOCALIZING A POINT USING THE BINARY TREE

The following method will determine in which polygon (sector), if any, a point lies. First, a general description of this method will be provided and then an more detailed exemplary flow chart for performing this method will be described in detail.

Basically, the point localizing method drops a point down the binary tree to determine in which polygon the point resides, if any.

First of all, the location of the point must be known. For example, the input device 160 may include an Airport Surface Detection Equipment (ASDE) system which can locate an object and provide the location information to the computer 100 so that the point can be localized within one of the polygonal sectors.

In a basic sense, the location of the point is tested against the root polygon to determine if the point is to the left or to the right of the root polygon. Another test is made to determine if a point is within the root polygon.

Figure 9:
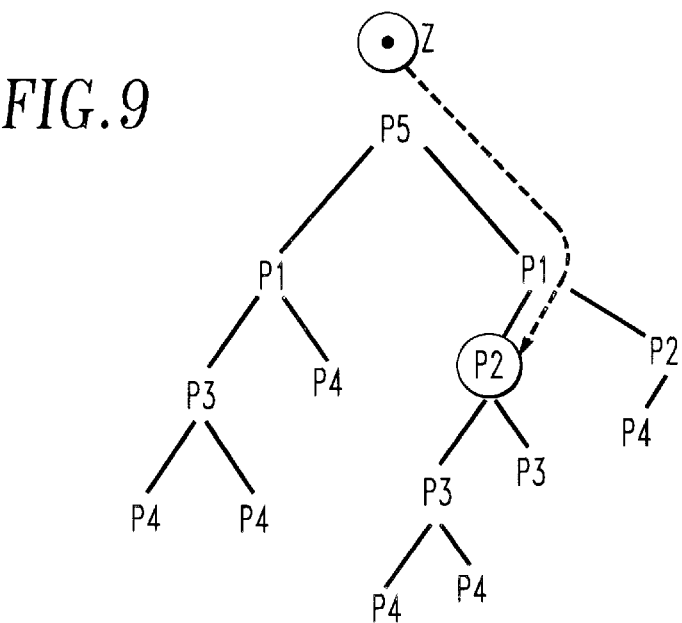
FIG. 9 is a binary tree showing how point Z traverses across this binary tree.

If the point is to the right of the root polygon, as shown in FIG. 9, then the method proceeds to right leaf (polygon P1). The right leaf is then tested to determine if the point is to the left, to the right or within the right leaf. By successively traversing the binary tree in this way, the method rapidly determines which polygon, if any, encloses the point. If the tree is completely traversed and no polygon encloses the point, then the method has determined that the point does not lie within any of the known polygons.

Figure 8A:
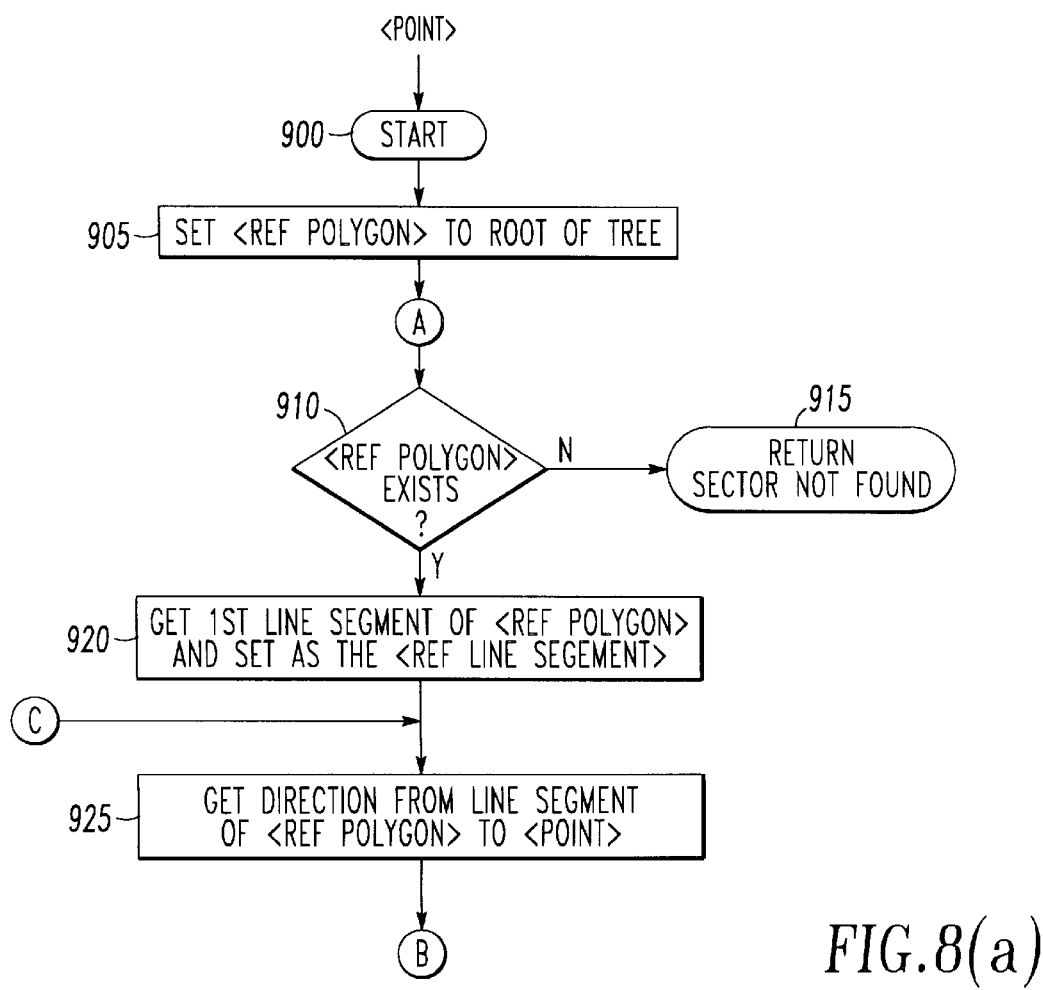
FIGS. 8(a) and 8(b) are exemplary flow charts for traversing the binary tree and determining which polygon, if any, encloses the point.
Figure 8B:
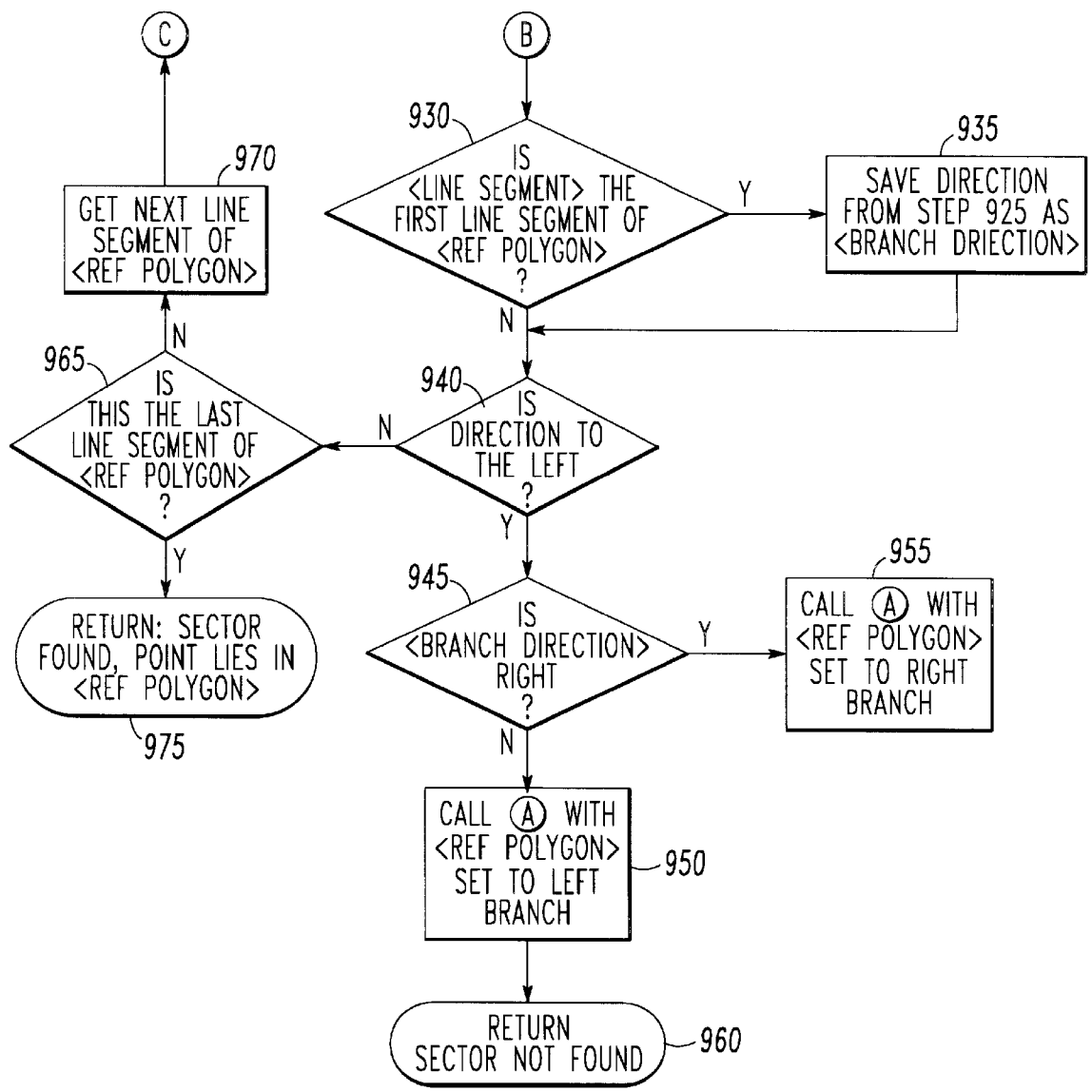

FIGS. 8(a)–(b) describe a particular method for dropping the point down the binary tree to determine which polygon encloses the point to thereby localize the point within a polygon.

As shown in FIG. 8(a), this method starts at start step 900.

Next, the method proceeds to step 905 which is an initialization step that sets the reference polygon to the root of the binary tree. As in the other methods described above, this method also employs the concept of a reference polygon.

Then, decision step 910 tests whether the reference polygon exists. This is a test to determine if the binary tree has been completely traversed without finding a polygon that encloses the point. If the reference polygon does not exist, then no polygon contains the point and the method ends.

If the reference polygon does exist as determined in 910, then the method proceeds to step 920.

Step 920 retrieves the first line segment of the reference polygon. In other words, the first line segment of the reference polygon is used as a directional reference as in the binary tree building method described above.

Next, the method proceeds to step 925 which determines the direction from the line segment of the reference polygon to the point. Step 925 uses the cross product equations which are set forth above. The A vector is the line segment of the reference polygon with its associated direction. The B vector is a vector from the beginning end point of the first line segment of the reference polygon to the point. As described above, the cross product equations will determine if the point is to the left or to the right of the first line segment of the reference polygon.

Then, the method proceeds to point B on FIG. 8(*b*) wherein step 930 is performed.

Step 930 checks whether the reference line segment (denoted as <line segment> in the flow charts) is the first line segment of the reference polygon.

If the reference line segment is the first line segment of the reference polygon, then the method proceeds to step 935 which saves the direction determined from step 925 as the branch direction. This step preserves the branch direction in the case that the reference polygon does not enclose the point as will be described later.

If step 930 determines that the reference line segment is not the first line segment of the reference polygon, then the method proceeds to step 940.

Step 940 is a decision block which tests if the direction is to the left. The direction value was determined in step 925.

If step 940 determines that the direction is not to the left (in other words the direction is to the right), then the method proceeds to step 965. Conceptually, this corresponds to a partial determination that the point may be within the reference polygon. If the method continues to find the point to the right of each successive line segment of the reference polygon, then the method has determined that the reference polygon encloses the point.

Step 965 is a decision block which tests whether the reference line segment is the last line segment of the reference polygon. If the reference line segment is the last line segment of the reference polygon, then as discussed above, the method has determined that the point lies completely within the reference polygon. In other words, the point is to the right of all line segments of the reference polygon which necessarily implies the point is within the reference polygon. In this case, the method proceeds to step 975 which returns the output that the sector has been found and that the point lies in the reference polygon (sector).

If step 965 determines that the reference line segment is not the last line segment of the reference polygon, then the method proceeds to step 970. Conceptually, this corresponds to the case where the point is to the right of at least some of the line segments, but not yet all, of the reference polygon.

Step 970 retrieves the next line segment of the reference polygon and sets the reference line segment as this next line segment. Then, the method proceeds to point C in FIG. 8(*a*) which then executes step 925 that finds the direction of the reference line segment of the reference polygon with respect to the point.

Continuing the discussion of the method shown in FIG. 8(*b*): if step 940 determines that the direction of the reference line segment with respect to the point is to the left, then the method proceeds to step 945. Conceptually, this occurs when the method is unable to find the point within the reference polygon. As long as the method successively finds the point to the right of each successive line segment, then the method assumes that the reference polygon may enclose that point. As soon as a left direction is found, this assumption is then proven incorrect.

Step 945 is a decision block which tests the branch direction that was set in step 935. Conceptually, the method then must proceed to the next leaf to determine if that leaf may enclose the point. The branch direction saved in step 935 determines this next search direction of the method.

If step 945 determines that the branch direction is to the right, then the method proceeds to step 955.

Step 955 recursively performs or calls the routine beginning at point A in FIG. 8(*a*) with the reference polygon set to the right branch. In other words, the reference polygon is set to the right branch of the reference polygon and the method proceeds to point A as shown in FIG. 8(*a*) which then executes step 910, etc.

Similarly, if step 945 determines that the branch direction is not to the right (the branch direction is to the left), then the method proceeds to step 950.

Step 950 is similar to step 955, but sets the reference polygon to the left branch of the reference polygon when recursively performing the routine beginning at point A on FIG. 8(*a*).

Because both steps 950 and 955 are recursive steps which recursively call the routine beginning at point A on FIG. 8(*a*), the method will proceed until all polygons in the binary tree are traversed. If this traversal of the binary tree is unsuccessful by this recursive calling in steps 955 and 950, then the method proceeds to step 960.

Step 960 is a return step which returns the output that the sector is not found. In other words, no polygon in the binary tree encloses the point.

The progression of this method is illustrated in FIG. 9. The point being localized is point Z shown in FIG. 1. Point Z is also diagrammatically shown in FIG. 9 which shows how point Z is dropped down the binary tree.

Using the above described method, a physical surface can be represented by a plurality of line segments and fed into a computer. The method then proceeds to generate a list of polygons from the defined line segments. Using this list of polygons, the method can organize this list of polygons into a binary tree to encode the relative positions of the polygons. Then, a point can be dropped down the binary tree to determine which polygon encloses the point to thereby localize the point.

It is to be noted that the majority of the processing is performed prior to the real-time operation of localizing the point. In other words, the calculation intensive method of generating the list of polygons, and organizing the list of polygons into a binary tree can be performed independently of the method of localizing the point by dropping it down the binary tree.

This front-end loaded processing is particularly important when this method is applied to airport surfaces.

Typically, an air traffic controller responsible for controlling the ground traffic on an airport has a map of the airport surface. This map can be fed into the computer by using the line segment drawing method described above. The method can then proceed to organize the list of polygons into a binary tree before the air traffic controller ever needs to access this binary tree. Thus, the bulk of the calculations are performed before any real-time operation is demanded by the air traffic controller.

The air traffic controller can then rapidly localize a point on the airport surface by employing the method described in FIGS. 8(*a*)–(*b*). The point can be, for example, the location of an aircraft traveling on the airport surface.

For example, as an aircraft proceeds from a ramp area to a taxi-way to a runway (active or inactive), the radar will keep track of the aircraft's position. This position corresponds to the point described above. Using the inventive method, the air traffic controller can localize this point to determine which sector (polygon) contains the aircraft. In this way, the air traffic controller can determine whether the aircraft has entered, for example, an active runway.

This aircraft localization can be quite important if the active runway is about to receive an aircraft performing a landing. Obviously, the active runway can only safely contain either the approaching aircraft for landing or the aircraft seeking to take off, but not both. Using the point localization method described above, the air traffic controller can rapidly determine in which sector each aircraft is located. Thus, the air traffic controller can more rapidly and accurately direct the traffic on the airport surface.

As a further alternative, the point localization information can be used by safety logic embedded in the computer 100 to automatically send warning signals or cue the air traffic controller to otherwise resolve the sector conflict.

The point localization method may also be used in a variety of situations relating to air traffic control. For example, if a track is localized to an area of concern (such as an active runway), then the air traffic controller can issue an area alert to divert any impending incursions.

Another application is to data fusion for determining a track's possible location in a coast area or a coast exit area.

Yet another application is with a tag manager for determining which tags, if any, are displayed for a track in a given locale.

This method also has applications to fields other than air traffic control. Any two-dimensional surface which can be represented with line segments can be organized into a binary tree using the above method. Then, a point on that two-dimensional surface can be localized within one of the polygons. Any system which has these requirements can be improved by the application of the above method.

Another specific area for applying this invention is emergency dispatch. An emergency dispatch center which dispatches, for example, police cars or rescue squads can use the invention to efficiently dispatch the emergency vehicles. When an emergency arises, and, for example, a 911 emergency telephone call is placed to the emergency dispatch center, the emergency dispatch center can localize this 911 point within a sector of the emergency dispatch area. Each sector could, for example, correspond to a particular local rescue squad. Thus, the emergency dispatcher can rapidly determine which rescue squad to send to the emergency (point).

In fact, any dispatching service could benefit from the inventive method. For example, a taxi dispatch center can more effectively dispatch the various cabs so that customers can be more efficiently served. In this case, the point would correspond to the pick-up point that the customer desired to be picked up by the cab. Each cab would then be assigned a sector(s). Localizing the pick-up point within one of these sectors will enable an efficient and accurate dispatch.

A computer code listing follows which is an example showing how the inventive methods could be implemented in a computer. When the computer 100 is programmed with this code, or other equivalent codes embodying the invention, then a special purpose machine will result which is capable of performing the methods described above.

Furthermore, the computer 100 is equipped with a mass storage device 140, keyboard 150, stylas 152, mouse 154, input device 160, display 110, printer 130 and an output device 120. Results of the invention are displayed on these various devices. For example, the display 110 may be an air traffic controller display which graphically illustrates the sectors of the airport. Furthermore, when the point representing an object on the airport surface has been localized within a sector, then this result can graphically represented on the display 110.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Exemplary Computer Program Listing
Implementing Invention

```c
#include <alloc.h>
#include <math.h>
#include <stdio.h>
include <string.h> typedef unsigned short boolean;

define False                0
#define True                 1

/***** memory initialization constants
****************************************/ define NotDefinedByte       0x5a
define NotDefinedShort      0x5a5a
define NotDefinedLong   0x5a5a5a5aL /***** geometric constants
******************************************************/ define QuarterPi            (0.25 * Pi)
define HalfPi               (0.50 * Pi)
#define ThreeQuartersPi      (0.75 * Pi)
#define Pi                   3.141592653589793
#define FiveQuartersPi       (1.25 * Pi)
#define ThreeHalvesPi        (1.50 * Pi)
#define SevenQuartersPi      (1.75 * Pi)
#define TwoPi                (2.00 * Pi)

/***** buffer lengths
***********************************************************/ define LneBufLen            128 define MaxLSgLen            1250
define MaxPolySides         8

/***** mathematical macros
*****************************************************/ define max(a,b)    (((a) > (b)) ? (a) : (b))
define min(a,b)    (((a) < (b)) ? (a) : (b))

/***** generic structures
******************************************************/ struct coordl { long x,                  // long coordinates
                     y;
              };

struct coordEp { long x,
                      y;
                float rho,
                      theta;
               };

struct lneSegs { boolean reverse;
                 struct coordEp eP1,      // line segments
                                eP2;
                 struct coordl delta;     // delta x, y
                 float length;
```

```
                        };

struct lsArys  { short   curSiz,           // current # of lneSegs
defined
                         maxSiz;           // maximum # of lneSegs
                 struct lneSegs ary[];
               };

union datTyps { struct { unsigned char   d0, d1, d2, d3; } uc;
                struct {          char   d0, d1, d2, d3; } ch;
                struct { unsigned short  d0, d1;         } us;
                struct {          short  d0, d1;         } sh;
                unsigned long   ul;
                         long   lg;
                float           fl;
                unsigned char   by[4];
                unsigned char   *bp;

union   datTyps *dp;
                union   lnkTyps *lp;
                struct  fstQues *qu;
                struct  datLnks *lk;
              };

/***** fast stack structures
 ****************************************************/ struct datStrs { unsigned short maxSiz, // maximum size of data heap
                                recSiz, // record size
                                curSiz; // current size of record heap
                 boolean alloc;         // new record added
                 unsigned short get,    // get index
                                put;    // put index
                 union datTyps heap[];  // heap of data reords
               };

struct fstLnks { struct fstLnks *sib;
                 union datTyps dat;
               };

struct fstStks { struct fstLnks *stkPtr,
                                *heap;
                 struct datStrs *data;
               };

/***** sector tree structures
 ****************************************************/ struct treNdes { struct treNdes *left,    // tree Nodes
                                *rght;
                 short  idx;              // index into array of type
               };

struct lsPtrs { short idx;
                boolean reverse;
              };

struct lsPtrStr { struct lsPtrs   line;
                  struct lsPtrStr *next;
                };
```

```
struct lsPtrArys { short curSiz,
                          maxSiz;
                    struct lsPtrs ary[];
                 };

struct plyStrs { char *name;              // polygon name
                 long value;              // polygon value
                 struct lsPtrArys *ls;    // line segment array ptr
                 struct coordl cntr;      // pt. in poly./polygon center
               };

struct plyArys { short  curSiz;           // current # of polygons defined
                 short  maxSiz;           // array of polygons
                 struct plyStrs *ary[];
               };

//========================
//| Fast Stack functions |
//========================

//================================================================
//| Initialize user data heap structures
//|---------------------------------------------------------------
//|  Inputs :
//|    maxSiz - user data heap size,
//|                  it is recommended that it be one more than
//|                  the structure's maxSiz
//|    recSiz - maximum data record size, N/A if maxSiz = 0,
//|                                       0..65535 otherwise
//|    curSiz - number of records to create
//|---------------------------------------------------------------
//| Output :
//|    If successful, pointer to data heap structure
//|    NULL otherwise, ie. maxSiz = 0
//|---------------------------------------------------------------
struct datStrs *initDatStr (unsigned short maxSiz,
                            unsigned short recSiz,
                            unsigned short curSiz)

{
  short i;

struct datStrs *datStr;
  union  datTyps dat;
```

```
  if ((maxSiz < 1) || ((recSiz > 0) && (curSiz > maxSiz)))
     return (NULL);

datStr = (struct datStrs *)
    malloc (sizeof(struct datStrs) +
            (sizeof(union datTyps *) * (maxSiz + 1)));
  datStr->maxSiz = maxSiz;
  datStr->recSiz = recSiz;
  datStr->curSiz = curSiz;
  datStr->get = 0;
  datStr->put = curSiz;

if (curSiz)
    for (i = 0; i < curSiz; i++)
    {
      if (recSiz)
      {
        dat.dp = (union datTyps *) malloc (recSiz);
        datStr->alloc = True;
      }
      else
      {
        dat.dp = NULL;
        datStr->alloc = False;
      } datStr->heap[i] = dat;
    }
  else
    datStr->alloc = False;

for (i = curSiz; i <= maxSiz; i++)
    datStr->heap[i].dp = NULL;

return (datStr);
}
//==========================================================================
======
//| Initialize fast stack structure
|
//|------------------------------------------------------------------------
-----|
//| Inputs :
|
//|    stkSiz : maximum size of stack 0..32787
|
//|    maxSiz : user data heap size,
|
//|             0 if database is not a part of link structure
|
//|             otherwise, it is the maximum data heap size
|
//|             it is recommended that it be one more than
|
//|             the structure's stkSiz
|
//|    recSiz : maximum data record size, 0 if maxSiz = 0,
|
```

```
//|                                     1..32767 otherwise
|
//|   curSiz : number of data records to create
|
//|----------------------------------------------------------------------
-----|
//| Output :
|
//|   if stkSiz, maxSiz and recSiz is within range,
|
//|      pointer to fast stack structure
|
//|   otherwise, NULL
|
//|----------------------------------------------------------------------
-----|
struct fstStks *initFstStk (short stkSiz,
                            short maxSiz,
                            short recSiz,
                            short curSiz)

{
  short i;

struct fstLnks *fstLnk,
                 **memAdr;
  struct fstStks *fstStk;

if ((stkSiz < 0) || (maxSiz < 0) ||
      ((maxSiz != 0) && (recSiz == 0)))
    return (NULL);

fstStk = (struct fstStks *) malloc (sizeof(struct fstStks));
  fstStk->stkPtr = NULL;
  memAdr = &(fstStk->heap);

if (stkSiz)
  {
    for (i = 0; i < stkSiz; i++)
    {
      fstLnk = *memAdr = (struct fstLnks *) malloc (sizeof(struct
fstLnks));
      fstLnk->dat.dp = NULL;
      memAdr = &(fstLnk->sib);
    }
    fstLnk->sib = NULL;
  }
  else
    *memAdr = NULL;

fstStk->data = initDatStr (maxSiz, recSiz, curSiz);

return (fstStk);
}
//======================================================================
======
//| Push user data onto fast stack
|
//|----------------------------------------------------------------------
-----|
```

```
//| Inputs :
//|   fstStk : fast stack structure
//|   dat    : user data
//|----------------------------------------------------------------
//| OutPut :
//|   if push operation is successful, True
//|   otherwise, False, ie. stack is full
//|----------------------------------------------------------------
boolean pshFstStk (struct fstStks *fstStk,
                   union datTyps dat)

{
  struct fstLnks *tmpPtr;

if ((tmpPtr = fstStk->heap) == NULL)
    return (False);

fstStk->heap = tmpPtr->sib;
  tmpPtr->dat = dat;
  tmpPtr->sib = fstStk->stkPtr;
  fstStk->stkPtr = tmpPtr;

return (True);
}

//=================================================================
//| Pop user data off from fast stack
//|----------------------------------------------------------------
//| Inputs :
//|   fstStk   : fast stack structure
//|----------------------------------------------------------------
//| Output :
//|   If pop operation is successful, True
//|   otherwise, False, ie. stack is empty
//|----------------------------------------------------------------
//| Input/Output :
//|   dat  I: the address of an allotted union datTyps for the output
//|   *dat O: user data
//|----------------------------------------------------------------
```

```
boolean popFstStk (struct fstStks *fstStk,
                   union datTyps *dat)

{
  struct fstLnks *ptr;

if ((ptr = fstStk->stkPtr) == NULL)
    return (False);

*dat = ptr->dat;
  fstStk->stkPtr = ptr->sib;
  ptr->sib = fstStk->heap;
  fstStk->heap = ptr;

return (True);
}

/*
   Finds in which polygon a point lies.
*/
short edtFindPolygonIdx (struct treNdes *parent,
                         struct plyArys *plys,
                         struct lsArys *lneSeg,
                         long x,
                         long y)

{
  boolean left = False;

short i = 0,
        lneIdx,
        secIdx;

double branchDir,
         dir,
         x0,
         y0,
         dx,
         dy;

struct lsPtrArys *ls;

if (!parent)
    return (NotDefinedShort);

ls = plys->ary[parent->idx]->ls;

while ((i < ls->curSiz) && !left)
  {
    lneIdx = ls->ary[i].idx;

if (ls->ary[i].reverse)
    {
      x0 = lneSeg->ary[lneIdx].eP2.x;
      y0 = lneSeg->ary[lneIdx].eP2.y;
      dx = -lneSeg->ary[lneIdx].delta.x;
      dy = -lneSeg->ary[lneIdx].delta.y;
    }
    else
    {
      x0 = lneSeg->ary[lneIdx].eP1.x;
```

```
      y0 = lneSeg->ary[lneIdx].eP1.y;
      dx = lneSeg->ary[lneIdx].delta.x;
      dy = lneSeg->ary[lneIdx].delta.y;
    } dir = ((x - x0) * dy) - (dx * (y - y0));

if (!i)
      branchDir = dir;

if (dir >= 0)
      i++;
    else
    {
      left = True;

if (branchDir >= 0)
        secIdx = edtFindPolygonIdx (parent->rght, plys, lneSeg, x, y);
      else
        secIdx = edtFindPolygonIdx (parent->left, plys, lneSeg, x, y);
    }
  } if (i == ls->curSiz)
    secIdx = parent->idx;

return (secIdx);
}

/*
   Allocate memory for an array of line segments.
*/
struct lsArys *edtInitLneSegStr (short siz)

{
  struct lsArys *lneSeg;

lneSeg = (struct lsArys *) malloc (sizeof(struct lsArys) +
                                     (siz * sizeof(struct lneSegs)));
  lneSeg->curSiz = 0;
  lneSeg->maxSiz = siz;

return (lneSeg);
}
/*
   Loads a list of line segments from a file.
*/
boolean edtLoadLneSegFile (char *lneSegFileName,
                           struct lsArys **lneSegPtr,
                           struct coordl *offset,
                           short maxSiz)

{
  char lneBuf[LneBufLen];

short i,
        siz;

FILE *dataFile;
```

```
  struct lsArys  *lneSeg;
  struct lneSegs *line;

if ((dataFile = fopen (lneSegFileName, "rt")) == NULL)
    return (False);

fgets (lneBuf, LneBufLen, dataFile);
  sscanf (lneBuf, "%i", &siz);

if (!*lneSegPtr)
    *lneSegPtr = edtInitLneSegStr (max (maxSiz, siz));

lneSeg = *lneSegPtr;
  lneSeg->curSiz = siz;

for (i = 0; i < lneSeg->curSiz; i++)
  {
    line = &lneSeg->ary[i];

fgets (lneBuf, LneBufLen, dataFile);
    sscanf (lneBuf, "%li, %li, %li, %li, %li, %li",
            &line->eP1.x,   &line->eP1.y,
            &line->eP2.x,   &line->eP2.y,
            &line->delta.x, &line->delta.y);

if (offset)
    {
      line->eP1.x -= offset->x;
      line->eP1.y -= offset->y;
      line->eP2.x -= offset->x;
      line->eP2.y -= offset->y;
    } line->length = hypot (line->delta.x, line->delta.y);
  } fclose (dataFile);

return (True);
}
//------------------------- Line Segment Translator -------------------
-------

/*
   Allocates memory for a single polygon structure.
*/
struct plyStrs *edtInitPlyStr (short siz)

{
  struct plyStrs *ply;

ply = (struct plyStrs *) malloc (sizeof (struct plyStrs));
  ply->name = NULL;
  ply->ls = (struct lsPtrArys *) malloc (sizeof (struct lsPtrArys) +
                                         (siz * sizeof(struct lsPtrs)));
  ply->ls->curSiz = 0;
  ply->ls->maxSiz = siz;

return (ply);
```

```
}
/*
   Allocates memory for an array of polygons.
*/
struct plyArys *edtInitPlyArys (short siz)

{
  short i;

struct plyArys *plys;

plys = (struct plyArys *) malloc (sizeof (struct plyArys) +
                                    (siz * sizeof (struct plyStrs *)));
  plys->curSiz = 0;
  plys->maxSiz = siz;

for (i = 0; i < siz; i++)
    plys->ary[i] = NULL;

return (plys);
}

/*
   Loads a file containing a list of line segments and a list of
polygons
   enclosed by those line segments.
*/
boolean edtLoadBinLstFile (char *binLstFileName,
                           struct lsArys **lneSegPtr,
                           struct plyArys **plysPtr,
                           struct coordl *offset)

{
  char lneBuf[LneBufLen];

short i,
        j,
        siz;

FILE *dataFile;

struct lneSegs *line;
  struct lsArys  *lneSeg;
  struct plyArys *plys;
  struct plyStrs *ply;

if ((dataFile = fopen (binLstFileName, "rt")) == NULL)
    return (False);

fgets (lneBuf, LneBufLen, dataFile);
  sscanf (lneBuf, "%i", &siz);

if (!*lneSegPtr)
    *lneSegPtr = edtInitLneSegStr (siz);

lneSeg = *lneSegPtr;
  lneSeg->curSiz = siz;

for (i = 0; i < lneSeg->curSiz; i++)
  {
```

```
    line = &lneSeg->ary[i];

fgets (lneBuf, LneBufLen, dataFile);
    sscanf (lneBuf, "%li, %li, %li, %li, %li, %li",
            &line->eP1.x,   &line->eP1.y,
            &line->eP2.x,   &line->eP2.y,
            &line->delta.x, &line->delta.y);

if (offset)
    {
      line->eP1.x -= offset->x;
      line->eP1.y -= offset->y;
      line->eP2.x -= offset->x;
      line->eP2.y -= offset->y;
    }
  } fgets (lneBuf, LneBufLen, dataFile);
  sscanf (lneBuf, "%i", &siz);

if (!*plysPtr)
    *plysPtr = edtInitPlyArys (siz);

plys = *plysPtr;
  plys->curSiz = siz;

for (i = 0; i < plys->curSiz; i++)
  {
    fgets (lneBuf, LneBufLen, dataFile);
    sscanf (lneBuf, "%i", &siz);

if (!plys->ary[i])
      ply = plys->ary[i] = edtInitPlyStr (siz);

ply->ls->curSiz = siz;

for (j = 0; j < siz; j++)
    {
      fgets (lneBuf, LneBufLen, dataFile);
      sscanf (lneBuf, "%i, %i",
              &ply->ls->ary[j].idx, &ply->ls->ary[j].reverse);
    } fgets (lneBuf, LneBufLen, dataFile);
    sscanf (lneBuf, "%li, %li", &ply->cntr.x, &ply->cntr.y);

if (offset)
    {
      ply->cntr.x -= offset->x;
      ply->cntr.y -= offset->y;
    }
  } fclose (dataFile);

return (True);
}

/*
   Saves a file containing a list of line segments and a list of
polygons
```

```
    enclosed by those line segments.
*/
boolean edtSaveBinLstFile (char *binLstFileName,
                           struct lsArys *lneSeg,
                           struct plyArys *plys)

{
  short i,
        j;

FILE *dataFile;

if ((dataFile = fopen (binLstFileName, "wt")) == NULL)
    return (False);

fprintf (dataFile, "%i\n", lneSeg->curSiz);

for (i = 0; i < lneSeg->curSiz; i++)
    fprintf (dataFile, "%li, %li, %li, %li, %li, %li\n",
             lneSeg->ary[i].eP1.x,   lneSeg->ary[i].eP1.y,
             lneSeg->ary[i].eP2.x,   lneSeg->ary[i].eP2.y,
             lneSeg->ary[i].delta.x, lneSeg->ary[i].delta.y);

fprintf (dataFile, "%i\n", plys->curSiz);

for (i = 0; i < plys->curSiz; i++)
  {
    fprintf (dataFile, "%i\n", plys->ary[i]->ls->curSiz);
    for (j = 0; j < plys->ary[i]->ls->curSiz; j++)
      fprintf (dataFile, "%i, %i\n",
               plys->ary[i]->ls->ary[j].idx,
               plys->ary[i]->ls->ary[j].reverse);

fprintf (dataFile, "%li, %li\n",
             plys->ary[i]->cntr.x, plys->ary[i]->cntr.y);
  } fclose (dataFile);

return (True);
}

/*
   Used by edtGenPolygonList to get line segment storage from the heap.
*/
struct lsPtrStr *edxGetLsPtr (struct lsPtrStr *heap)

{
  struct lsPtrStr *line;

if (!heap->next)
  {
    line = (struct lsPtrStr *) malloc (sizeof (struct lsPtrStr));
    line->next = NULL;
  }
  else
  {
    line = heap->next;
    heap->next = line->next;
  }
```

```
  return (line);
}

/*
   Used by edtGenPolygonList to return line segment storage to the heap.
*/
void deleteLsPtr (struct lsPtrStr *heap,
                  struct lsPtrStr *line)

{
  line->next = heap->next;
  heap->next = line;
}

/*
   Used by edtGenPolygonList to start a new list of line segments that
may
   comprise a polygon.
*/
void startList (struct plyArys *plys)

{
  if (!plys->ary[plys->curSiz])
    plys->ary[plys->curSiz] = edtInitPlyStr (MaxPolySides);

plys->ary[plys->curSiz]->ls->curSiz = 0;
  plys->curSiz++;
}

/*
   Used by edtGenPolygonList to add a line segment to the list of line
segments
   that may comprise a polygon.
*/
void addToList (struct plyArys *plys,
                struct lsPtrs *line)

{
  struct lsPtrArys *ls;

ls = plys->ary[plys->curSiz - 1]->ls;

ls->ary[ls->curSiz].idx = line->idx;
  ls->ary[ls->curSiz].reverse = line->reverse;
  ls->curSiz++;
}

/*
   Used by edtGenPolygonList to delete the entire list of line segments
   that may comprise a polygon.
*/
void eraseList (short strikeList[],
                struct plyArys *plys)

{
  short i;

struct lsPtrArys *ls;

plys->curSiz--;
```

```
  if (plys->ary[plys->curSiz])
  {
    ls = plys->ary[plys->curSiz]->ls;
    for (i = 0; i < ls->curSiz; i++)
      strikeList[ls->ary[i].idx]--;
  }
}

/*
   Used by edtGenPolygonList to indicate each time that a line segment
has
   been used in the creation of a polygon.
*/
void addAStrike (short strikeList[],
                 struct lsPtrs *line)

{
  strikeList[line->idx]++;
}

/*
   Used by edtGenPolygonList to determine if a line segment has been
used in
   the creation of two polygons (the maximum).
*/
boolean lineUsedTwice (short strikeList[],
                       struct lsPtrs *line)

{
  return (strikeList[line->idx] >= 2);
}

/*
   Used by edtGenPolygonList to find the line segement that is "most to
the
   right" (i.e. with which it creates the smallest angle on the right
hand
   side) of the reference line segment.
*/
struct lsPtrStr *edtFindRightMostLine (struct lsArys *lneSeg,
                                       struct lsPtrs *refLine,
                                       struct lsPtrStr *lsPtrHeap)

{
  short i,
        lneIdx,
        sign;

double aDotB,
         ang,
         dir,
         dxA,
         dyA,
         dxB,
         dyB,
         magA,
         magB,
         smallestAngle = TwoPi,
         x1A,
         y1A,
         x2A,
```

```
            y2A,
            x2B,
            y2B;

struct lsPtrStr *rightMostLine = NULL;

lneIdx = refLine->idx;

if (refLine->reverse)
   {
     x1A = lneSeg->ary[lneIdx].eP2.x;
     y1A = lneSeg->ary[lneIdx].eP2.y;
     x2A = lneSeg->ary[lneIdx].eP1.x;
     y2A = lneSeg->ary[lneIdx].eP1.y;
     dxA = (double) -lneSeg->ary[lneIdx].delta.x;
     dyA = (double) -lneSeg->ary[lneIdx].delta.y;
   }
   else
   {
     x1A = lneSeg->ary[lneIdx].eP1.x;
     y1A = lneSeg->ary[lneIdx].eP1.y;
     x2A = lneSeg->ary[lneIdx].eP2.x;
     y2A = lneSeg->ary[lneIdx].eP2.y;
     dxA = (double) lneSeg->ary[lneIdx].delta.x;
     dyA = (double) lneSeg->ary[lneIdx].delta.y;
   } for (i = 0; i < lneSeg->curSiz; i++)
      if ((i != lneIdx) &&
           (((lneSeg->ary[i].eP1.x == x2A) && (lneSeg->ary[i].eP1.y ==
y2A)) ||
            ((lneSeg->ary[i].eP2.x == x2A) && (lneSeg->ary[i].eP2.y ==
y2A))))
      {
         if ((lneSeg->ary[i].eP1.x != x2A) || (lneSeg->ary[i].eP1.y !=
y2A))
         {
            x2B = lneSeg->ary[i].eP1.x;
            y2B = lneSeg->ary[i].eP1.y;
            sign = -1;
         }
         else
         {
            x2B = lneSeg->ary[i].eP2.x;
            y2B = lneSeg->ary[i].eP2.y;
            sign = 1;
         } dir = ((x2B - x1A) * dyA) - (dxA * (y2B - y1A));

if (dir >= 0)   // to the right
         {
            dxB = (double) (lneSeg->ary[i].delta.x * sign);
            dyB = (double) (lneSeg->ary[i].delta.y * sign);

aDotB = - (dxA * dxB) - (dyA * dyB);
            magA = hypot(dxA, dyA);
            magB = hypot(dxB, dyB);
            ang = acos(aDotB / (magA * magB));

if (ang < smallestAngle)
```

```
            {
              smallestAngle = ang;

if (!rightMostLine)
                rightMostLine = edxGetLsPtr (lsPtrHeap);

rightMostLine->line.idx = i;
              rightMostLine->line.reverse = (sign == -1);
            }
        }
     } return (rightMostLine);
}

/*
   Used by edtGenPolygonList to determine if a line segement is already on the
   list of candidate line segements that may create a polygon.
*/
boolean lineAlreadyOnList (struct plyArys *plys,
                           struct lsPtrs *line)

{
  short i;

struct lsPtrArys *ls;

ls = plys->ary[plys->curSiz - 1]->ls;
  for (i = 0; i < ls->curSiz; i++)
    if (ls->ary[i].idx == line->idx)
      return (True);

return (False);
}

/*
   Used by edtGenPolygonList to determine if the most recently found polygon
   has already been found.
*/
boolean polygonAlreadyDefined (struct plyArys *plys)

{
  boolean lneSegMatch;

short i,
        j,
        k;

struct lsPtrArys *ls;

ls = plys->ary[plys->curSiz - 1]->ls;

for (i = 0; i < (plys->curSiz - 2); i++)
    if (plys->ary[i]->ls->curSiz == ls->curSiz)
    {
      for (j = 0; j < ls->curSiz; j++)
      {
        lneSegMatch = False;
        for (k = 0; k < ls->curSiz; k++)
```

```
              if (ls->ary[j].idx == plys->ary[i]->ls->ary[k].idx)
              {
                lneSegMatch = True;
                break;
              } if (!lneSegMatch)
              break;
          } if (lneSegMatch)
          return (True);
      } return (False);
  }

// declared global so as to avoid reallocation of mem on subsequent
calls
struct lsPtrStr *lsPtrHeap = NULL;
struct fstStks  *stack = NULL;

/*
   Given a list of closed line segments, this procedure generates a list
of
   polygons which the line segments enclose.
*/
boolean edtGenPolygonList (struct lsArys *lneSeg,
                           struct plyArys *plys)

{
  boolean done = False,
          lineFound;

short i,
        strikeList [MaxLSgLen],
        x1,
        x2;

long x,
       y;

struct lsPtrArys *ls;
  struct lsPtrStr  *nextLine,
                   *refLine;
  union  datTyps   stkData;

if (!stack)
    stack = initFstStk (plys->maxSiz, 0, 0, 0);

if (!lsPtrHeap)
    lsPtrHeap = (struct lsPtrStr *) malloc (sizeof (struct lsPtrStr));
  lsPtrHeap->next = NULL;

memset (strikeList, 0, MaxLSgLen * sizeof(short));

refLine = edxGetLsPtr (lsPtrHeap);
  refLine->line.idx = 0;
  refLine->line.reverse = False;

nextLine = NULL;
```

```
   startList (plys);
   while (!done)
   {
     stkData.dp = (union datTyps *) refLine;
     pshFstStk (stack, stkData);
     addToList (plys, &refLine->line);
     addAStrike (strikeList, &refLine->line);

lineFound = False;
     while (!lineFound && !done)
     {
       if ((refLine != nextLine) && nextLine)
         deleteLsPtr (lsPtrHeap, nextLine);

if ((nextLine =
             edtFindRightMostLine (lneSeg, &refLine->line, lsPtrHeap)) ==
NULL)
       {
         if (popFstStk (stack, &stkData))
         {
           refLine = (struct lsPtrStr *) stkData.dp;
           refLine->line.reverse = !refLine->line.reverse;
           eraseList (strikeList, plys);
           startList (plys);
         }
         else
           done = True;
       }
       else
         if (lineAlreadyOnList (plys, &nextLine->line))
         {
           if (polygonAlreadyDefined (plys))
           {
             for (i = 0; i < plys->ary[plys->curSiz - 1]->ls->curSiz;
i++)
             {
               if (popFstStk (stack, &stkData))
                 refLine = (struct lsPtrStr *) stkData.dp;
               else
               {
                 done = True;
                 break;
               } if (i < (plys->ary[plys->curSiz - 1]->ls->curSiz - 1))
                 deleteLsPtr (lsPtrHeap, refLine);
             } eraseList (strikeList, plys);
           }
           else
             if (popFstStk (stack, &stkData))
               refLine = (struct lsPtrStr *) stkData.dp;
             else
               done = True;

refLine->line.reverse = !refLine->line.reverse;

startList (plys);
         }
```

```
          else
            if (lineUsedTwice (strikeList, &nextLine->line))
            {
              if (!plys->ary[plys->curSiz - 1] ||
                  !plys->ary[plys->curSiz - 1]->ls->curSiz)
              {
                if (popFstStk (stack, &stkData))
                {
                  refLine = (struct lsPtrStr *) stkData.dp;
                  refLine->line.reverse = !refLine->line.reverse;
                }
                else
                  done = True;
              }
              else
              {
                for (i = 0; i < plys->ary[plys->curSiz - 1]->ls->curSiz;
i++)
                {
                  if (popFstStk (stack, &stkData))
                    refLine = (struct lsPtrStr *) stkData.dp;
                  else
                  {
                    done = True;
                    break;
                  } if (i < (plys->ary[plys->curSiz - 1]->ls->curSiz - 1))
                    deleteLsPtr (lsPtrHeap, refLine);
                } refLine->line.reverse = !refLine->line.reverse;
                eraseList (strikeList, plys);
                startList (plys);
              }
            }
            else
            {
              refLine = nextLine;
              lineFound = True;
            }
        }
      } if (plys->ary[plys->curSiz - 1])
        plys->curSiz--;

for (x1 = 0; x1 < plys->curSiz; x1++)
      {
        x = y = 0;
        ls = plys->ary[x1]->ls;
        for (x2 = 0; x2 < ls->curSiz; x2++)
          if (ls->ary[x2].reverse)
          {
            x += lneSeg->ary[ls->ary[x2].idx].eP2.x;
            y += lneSeg->ary[ls->ary[x2].idx].eP2.y;
          }
          else
          {
            x += lneSeg->ary[ls->ary[x2].idx].eP1.x;
            y += lneSeg->ary[ls->ary[x2].idx].eP1.y;
```

```
      }
    plys->ary[x1]->cntr.x = x / ls->curSiz;
    plys->ary[x1]->cntr.y = y / ls->curSiz;
  } return (True);
}

//------------------------- Polygon Tree Generator ---------------------
--------

/*
   Allocates memory for a node of a binary tree.
*/
struct treNdes *edtInitTreNdeStr (void)

{
  struct treNdes *tree;

tree = (struct treNdes *) malloc (sizeof(struct treNdes));
  tree->left = NULL;
  tree->rght = NULL;
  return (tree);
}

/*
   Inserts a polygon at its proper position in the binary tree.
*/
struct treNdes *edtInitPolygonNode (struct plyArys *plys,
                                    struct lsArys *lneSeg,
                                    struct treNdes *parent,
                                    struct treNdes *ndeImg)

{
  boolean left  = False,
          right = False;

short i,
        imgIdx;

long imgX0, imgX1,
       imgY0, imgY1,
       parX0, parY0,
       parDx, parDy;

float dir0, dir1;

struct lneSegs   *parentLsPtr;
  struct lsPtrArys *imgPolyLs,
                   *parentPolyLs;
  struct treNdes   *tempNode;

parentPolyLs = plys->ary[parent->idx]->ls;
  imgPolyLs    = plys->ary[ndeImg->idx]->ls;
  parentLsPtr  = &lneSeg->ary[parentPolyLs->ary[0].idx];

if (parentPolyLs->ary[0].reverse)
  {
    parX0 = parentLsPtr->eP2.x;
    parY0 = parentLsPtr->eP2.y;
```

```
    parDx = -parentLsPtr->delta.x;
    parDy = -parentLsPtr->delta.y;
  }
  else
  {
    parX0 = parentLsPtr->eP1.x;
    parY0 = parentLsPtr->eP1.y;
    parDx = parentLsPtr->delta.x;
    parDy = parentLsPtr->delta.y;
  } for (i = 0; (!left || !right) && (i < imgPolyLs->curSiz); i++)
  {
    imgIdx = imgPolyLs->ary[i].idx;

if (imgPolyLs->ary[i].reverse)
    {
      imgX0 = lneSeg->ary[imgIdx].eP2.x;
      imgY0 = lneSeg->ary[imgIdx].eP2.y;
      imgX1 = lneSeg->ary[imgIdx].eP1.x;
      imgY1 = lneSeg->ary[imgIdx].eP1.y;
    }
    else
    {
      imgX0 = lneSeg->ary[imgIdx].eP1.x;
      imgY0 = lneSeg->ary[imgIdx].eP1.y;
      imgX1 = lneSeg->ary[imgIdx].eP2.x;
      imgY1 = lneSeg->ary[imgIdx].eP2.y;
    } dir0 = ((float)(imgX0 - parX0) * parDy) - ((float)(imgY0 - parY0) *
parDx);
    dir1 = ((float)(imgX1 - parX0) * parDy) - ((float)(imgY1 - parY0) *
parDx);

if ((dir0 <= 0) || (dir1 <= 0))
      left = True;

if ((dir0 >= 0) || (dir1 >= 0))
      right = True;
  } if (left)
    if (parent->left)
      ndeImg = edtInitPolygonNode (plys, lneSeg, parent->left, ndeImg);
    else
    {
      parent->left = ndeImg;
      tempNode = ndeImg;

ndeImg = edtInitTreNdeStr ();
      ndeImg->idx = tempNode->idx;
    } if (right)
    if (parent->rght)
      ndeImg = edtInitPolygonNode (plys, lneSeg, parent->rght, ndeImg);
    else
    {
      parent->rght = ndeImg;
      tempNode = ndeImg;
```

```
      ndeImg = edtInitTreNdeStr ();
      ndeImg->idx = tempNode->idx;
    }
  return (ndeImg);
}

/*
  Called by the user to insert a polygon at its proper position in the
binary
  polygon tree.  To create a sector tree, this routine should be called
  successively for each polygon in the database (which is created by
  edtGenPolygonList, above.
*/
void edtCreatePolygonTree (struct plyArys *plys,
                           struct lsArys *lneSeg,
                           struct treNdes *tree,
                           short idx)

{
  struct treNdes *ndeImg;

if (idx)
  {
    ndeImg = edtInitTreNdeStr ();
    ndeImg->idx = idx;
    edtInitPolygonNode (plys, lneSeg, tree, ndeImg);
  }
  else
    tree->idx = idx;
} char polygonBuf[LneBufLen];   // This is declared here to reduce overhead
of the
                              // recursive routine edtSetPolygonNode /*
  Called by edtLoadPolyTreeFile to read the binary polygon tree from a
file
  and create the binary tree in memory.
*/
void edtSetPolygonNode (FILE *dataFile,
                        struct treNdes *parent)

{
  short idx;

struct treNdes *ndeImg;

fgets (polygonBuf, LneBufLen, dataFile);
  sscanf (polygonBuf, "%i", &idx);

if (idx == NotDefinedShort)
    parent->left = NULL;
  else
  {
    ndeImg = edtInitTreNdeStr ();
    ndeImg->idx = idx;
    parent->left = ndeImg;
    edtSetPolygonNode (dataFile, parent->left);
```

```
    }
    fgets (polygonBuf, LneBufLen, dataFile);
    sscanf (polygonBuf, "%i", &idx);

if (idx == NotDefinedShort)
      parent->rght = NULL;
    else
    {
      ndeImg = edtInitTreNdeStr ();
      ndeImg->idx = idx;
      parent->rght = ndeImg;
      edtSetPolygonNode (dataFile, parent->rght);
    }
}

/*
   Reads into memory a file containing
      1. a closed list of line segments,
      2. a list of polygons enclosed by those line segments, and
      3. a binary tree of the polygons.
*/
boolean edtLoadPolyTreeFile (char *polyTreeFileName,
                             struct lsArys **lneSegPtr,
                             struct plyArys **plysAryPtr,
                             struct treNdes **treePtr,
                             struct coordl *offset,
                             short maxLneSegs,
                             short maxPolys,
                             short maxPolySides)

{
  char lneBuf[LneBufLen];

short i,
        j,
        quotePtrE,
        quotePtrS,
        siz;

FILE *dataFile;

struct lneSegs *line;
  struct lsArys  *lneSeg;
  struct plyArys *plys;
  struct plyStrs *ply;

if ((dataFile = fopen (polyTreeFileName, "rt")) == NULL)
    return (False);

fgets (lneBuf, LneBufLen, dataFile);
  sscanf (lneBuf, "%i", &siz);

if (!*lneSegPtr)
    *lneSegPtr = edtInitLneSegStr (max (maxLneSegs, siz));

lneSeg = *lneSegPtr;
  lneSeg->curSiz = siz;

for (i = 0; i < lneSeg->curSiz; i++)
  {
```

```
   line = &lneSeg->ary[i];

fgets (lneBuf, LneBufLen, dataFile);
   sscanf (lneBuf, "%li, %li, %li, %li, %li, %li",
           &line->eP1.x,   &line->eP1.y,
           &line->eP2.x,   &line->eP2.y,
           &line->delta.x, &line->delta.y);

if (offset)
   {
      line->eP1.x -= offset->x;
      line->eP1.y -= offset->y;
      line->eP2.x -= offset->x;
      line->eP2.y -= offset->y;
   }
} fgets (lneBuf, LneBufLen, dataFile);
sscanf (lneBuf, "%i", &siz);

if (!*plysAryPtr)
   *plysAryPtr = edtInitPlyArys (max (maxPolys, siz));

plys = *plysAryPtr;
plys->curSiz = siz;

for (i = 0; i < plys->curSiz; i++)
{
   fgets (lneBuf, LneBufLen, dataFile);
   sscanf (lneBuf, "%i", &siz);

if (!plys->ary[i])
      ply = plys->ary[i] = edtInitPlyStr (max (maxPolySides, siz));

ply->ls->curSiz = siz;

for (j = 0; j < siz; j++)
   {
      fgets (lneBuf, LneBufLen, dataFile);
      sscanf (lneBuf, "%i, %i",
              &ply->ls->ary[j].idx, &ply->ls->ary[j].reverse);
   } fgets (lneBuf, LneBufLen, dataFile);
   quotePtrS = strcspn(lneBuf, "\"");
   quotePtrE = strcspn(lneBuf + quotePtrS + 1, "\"");
   lneBuf[quotePtrS + quotePtrE + 1] = '\0';

if (!ply->name)
      ply->name = (char *) malloc (quotePtrE + 1);

strcpy (ply->name, lneBuf + quotePtrS + 1);

fgets (lneBuf, LneBufLen, dataFile);
   sscanf (lneBuf, "%li", &ply->value);

fgets (lneBuf, LneBufLen, dataFile);
   sscanf (lneBuf, "%li, %li", &ply->cntr.x, &ply->cntr.y);

if (offset)
   {
```

```
      ply->cntr.x -= offset->x;
      ply->cntr.y -= offset->y;
    }
  } fgets (lneBuf, LneBufLen, dataFile);
  sscanf (lneBuf, "%i", &siz);

if (!*treePtr)
    *treePtr = edtInitTreNdeStr ();

fgets (lneBuf, LneBufLen, dataFile);
  sscanf (lneBuf, "%i", &((*treePtr)->idx));

edtSetPolygonNode (dataFile, *treePtr);

fclose (dataFile);

return (True);
}

/*
   Called by edtSavePolyTreeFile to write the binary polygon tree to a
file.
*/
void edtSaveBinTre (FILE *dataFile,
                    struct treNdes *parent)
{
  fprintf (dataFile, "%i\n", parent->idx);

if (!parent->left)
    fprintf (dataFile, "%i\n", NotDefinedShort);
  else
    edtSaveBinTre (dataFile, parent->left);

if (!parent->rght)
    fprintf (dataFile, "%i\n", NotDefinedShort);
  else
    edtSaveBinTre (dataFile, parent->rght);
}

/*
   Given a binary tree, this procedure counts the number of leaves on
the tree.
*/
short edtFindNumTreeLeaves (struct treNdes *parent,
                            short siz)

{
  short num;

if (!parent->left && !parent->rght)
    num = siz + 1;
  else
  {
    if (parent->left)
      num = edtFindNumTreeLeaves (parent->left, siz);

if (parent->rght)
      num = edtFindNumTreeLeaves (parent->rght, num);
  }
```

What is claimed:

1. A computer implemented method of localizing an object within a sector of a physical surface, comprising the steps of:

representing the physical surface by defining a plurality of non-intersecting line segments wherein each endpoint of each line segment touches an endpoint of at least one other line segment and wherein no interior angle of polygons formed by the line segments exceeds 180 degrees;

generating a list of polygons wherein each entry in the list of polygons includes a list of line segments taken from the defined line segments;

organizing the list of polygons into a binary tree to encode relative positions of the polygons; and dropping a point representing a location of the object on the physical surface down to the binary tree to determine which polygon encloses the point to thereby localize the point within a corresponding sector.

2. The computer implemented method of claim 1, said generating step further comprising the substeps of:

choosing a line segment from the defined line segments;

searching the defined line segments in a search direction for a line segment that shares an endpoint of the chosen line segment and which is right-most with respect to the chosen line segment;

designating the right-most line segment as the chosen line segment;

repeating said searching step and said designating step until a duplicate line segment is found or until no right-most line segment is found for the chosen line segment;

adding a new polygon to a polygon list when the duplicate line segment is found in said repeating step;

reversing the search direction and repeating said searching step, said designating step and said adding step if no right-most line segment is found for the chosen line segment in said searching step; and iterating said searching, said designating, said repeating, said adding, and said reversing steps until the list of polygons is empty.

3. The computer implemented method of claim 1, said generating step further comprising the substeps of:

choosing a line segment from the defined line segments;

searching the defined line segments in a search direction for a line segment that shares an endpoint of the chosen line segment and which is left-most with respect to the chosen line segment;

designating the left-most line segment as the chosen line segment;

repeating said searching step and said designating step until a duplicate line segment is found or until no left-most line segment is found for the chosen line segment;

adding a new polygon to a polygon list when the duplicate line segment is found in said repeating step;

reversing the search direction and repeating said searching step, said designating step and said adding step if no left-most line segment is found for the chosen line segment in said searching step; and iterating said searching, said designating, said repeating, said adding, and said reversing steps until the list of polygons is empty.

4. The computer implemented method of claim 1, said generating step further comprising the substeps of:

(a) setting a reference line segment to a first line segment;
(b) setting a direction flag to a first value;
(c) starting a PIP list;
(d) adding the reference line segment to the PIP list;
(e) pushing the reference line segment onto a stack;
(f) searching in a search direction determined by the direction flag for a line segment that shares an endpoint with the reference line segment and which is right-most with respect to the reference line segment;
(g) executing step (h) if said searching step finds a right-most line segment else executing step (r);
(h) determining if the right-most line is on the PIP list including the substeps of:
  (h1) defining a polygon and executing step (i) if said step (h) determines that the right-most line is on the PIP list, and
  (h2) executing step (x) if said step (h) determines that the right-most line is not on the PIP list;
(i) determining if the polygon defined in said step (h1) has already been defined in a previous iteration including the substeps of:
  (i1) finding a new polygon and executing step (j) if said step (i) determines that the polygon has not already been defined, and
  (i2) executing step (m) if said step (i) determines that the polygon has already been defined;
(j) stopping the method if the stack is empty;
(k) popping the stack to reset the reference line segment;
(l) proceeding to step (o);
(m) for all line segments in the PIP list execute steps (m1)–(m2);
  (m1) ending the method if the stack is empty; and
  (m2) popping the stack to reset the reference line segment;
(n) erasing the PIP list;
(o) changing the direction flag value;
(p) restarting the PIP list;
(q) executing step (f);
(r) stopping the method if the stack is empty;
(s) popping the stack to reset the reference line segment;
(t) changing the direction flag value;
(u) erasing the PIP list;
(v) restarting the PIP list;
(w) executing step (f);
(x) determining if the right-most line has already been processed twice;
(y) if said step (x) determines that the right-most line has already been used twice then executing step (z) else setting the reference line segment to the right-most line segment and executing said step (d);
(z) determining if the PIP list is empty;
(z1) if the PIP list is empty then ending the method if the stack is empty and popping the stack to reset the reference line segment, changing the direction flag value and executing step (f) if the stack is not empty;
(z2) if the PIP list is not empty then for all line segments in the PIP list execute steps (a'1)–(a'2);
  (a'1) ending the method if the stack is empty; and
  (a'2) popping the stack to reset the reference line segment;
(z3) changing the direction flag value;
(z4) erasing the PIP list;

(z5) restarting the PIP list; and
(z6) executing step (f).

5. The computer implemented method of claim 1, said generating step further comprising the substeps of:
(a) setting a reference line segment to a first line segment;
(b) setting a direction flag to a first value;
(c) starting a PIP list;
(d) adding the reference line segment to the PIP list;
(e) pushing the reference line segment onto a stack;
(f) searching in a search direction determined by the direction flag for a line segment that shares an endpoint of the reference line segment and which is left-most with respect to the reference line segment;
(g) executing step (h) if said searching step finds a left-most line segment else executing step (r);
(h) determining if the left-most line is on the PIP list including the substeps of:
(h1) defining a polygon and executing step (i) if said step (h) determines that the left-most line is on the PIP list, and
(h2) executing step (x) if said step (h) determines that the left-most line is not on the PIP list;
(i) determine if the polygon defined in said step (h1) has already been defined in a previous iteration including the substeps of:
(i1) executing step (j) if said step (i) determines that the polygon has not already been defined, and
(i2) executing step (m) if said step (i) determines that the polygon has already been defined;
(j) stopping the method if the stack is empty;
(k) popping the stack to reset the reference line segment;
(l) proceeding to step (o);
(m) for all line segments in the PIP list execute steps (m1)–(m2);
(m1) ending the method if the stack is empty; and
(m2) popping the stack to reset the reference line segment;
(n) erasing the PIP list;
(o) changing the direction flag value;
(p) restarting the PIP list;
(q) executing step (f);
(r) stopping the method if the stack is empty;
(s) popping the stack to reset the reference line segment;
(t) changing the direction flag value;
(u) erasing the PIP list;
(v) restarting the PIP list;
(w) executing step (f);
(x) determining if the left-most line has already been processed twice;
(y) if said step (x) determines that the left-most line has already been used twice then executing step (z) else setting the reference line segment to the left-most line segment and executing said step (d);
(z) determining if the PIP list is empty;
(z1) if the PIP list is empty then ending the method if the stack is empty and popping the stack to reset the reference line segment, changing the direction flag value and executing step (f) if the stack is not empty;
(z2) if the PIP list is not empty then for all line segments in the PIP list execute steps (a'1)–(a'2);
(a'1) ending the method if the stack is empty; and
(a'2) popping the stack to reset the reference line segment;

(z3) changing the direction flag value;
(z4) erasing the PIP list;
(z5) restarting the PIP list; and
(z6) executing step (f).

6. The computer implemented method of claim 1, said organizing step further comprising the substeps of:
placing a root polygon from the list of polygons at a root of the binary tree wherein the root polygon includes a first line segment having an associated direction, the first line segment being from the root polygon's list of line segments;
setting the root polygon as a reference polygon;
choosing a next polygon from the list of polygons and repeating the following steps until the list of polygons is empty;
a first determining step for determining whether the chosen polygon is to the left of the first line segment of the reference polygon;
a first placing step for recursively placing the chosen polygon as a left leaf of the reference polygon as long as the left leaf of the reference polygon does not exist;
setting the chosen polygon as the reference polygon and repeating said first determining step and said first placing step if the left leaf of the reference polygon does exist;
a second determining step for determining whether the chosen polygon is to the right of the first line segment of the reference polygon;
a second placing step for recursively placing the chosen polygon as a right leaf of the reference polygon if the right leaf of the reference polygon does not exist; and
setting the chosen polygon as the reference polygon and repeating said second determining step and said second placing step if the right leaf of the reference polygon does exist.

7. The computer implemented method of claim 1, said organizing step further comprising the substeps of:
(a) placing a polygon at a root of the binary tree;
(b) setting a reference polygon to be the polygon at the root of the binary tree;
(c) retrieving a new polygon from the list of polygons;
(d) setting a left direction flag and a right direction flag to false;
(e) setting a counter n=1;
(f) retrieving an n-th vertex of the new polygon;
(g) setting the right direction flag to true if the n-th vertex is to the right of the reference polygon's first line segment;
(h) setting the left direction flag to true if the n-th vertex is to the left of the reference polygon's first line segment;
(i) updating n by one;
(j) iterating said steps (f)–(i) until n exceeds the number of vertices in the new polygon or until either the left or right direction flag is true;
(k) if the left direction flag is true, then determining if a left branch of the binary tree exists with respect to the reference polygon including the substeps of;
(k1) if the left branch does not exist then adding the new polygon to the binary tree as a new left leaf and executing step (m), and
(k2) if the left branch does exist then resetting the reference polygon to a left leaf of the reference polygon and iterating said steps (d)–(k);

(l) if the right direction flag is true, then determining if a right branch of the binary tree exists with respect to the reference polygon including the substeps of;
  (l1) if the right branch does not exist then adding the new polygon to the binary tree as a new right leaf and executing step (m), and
  (l2) if the right branch does exist then resetting the reference polygon to a right leaf of the reference polygon and iterating said steps (d)–(l);
(m) iterating said steps (c)–(l) until the list of polygons is exhausted.

8. The computer implemented method of claim 1, said dropping step further comprising the substeps of:
  setting a root of the binary tree as a reference polygon;
  a first determining step for determining if the point is to the left or to the right of a first line segment of the reference polygon;
  a second determining step for determining if the reference polygon completely encloses the point and, if the reference polygon does completely enclose the point, outputting the reference polygon as the sector containing the point;
  setting the left or right branch of the reference polygon as the reference polygon based on said first determining step; and
  repeating said first determining step, said second determining step and said setting step until a reference polygon has been determined as completely enclosing the point or until the binary tree has been completely traversed.

9. The computer implemented method of claim 1, said dropping step further comprising the substeps of:
  (a) setting a root of the binary tree as a reference polygon;
  (b) recursively determining if the point is to the right of each line segment of a reference polygon until all line segments of the reference polygon have been processed whereupon the point is determined to be in the reference polygon or until the point is determined to be to the left of the current line segment whereupon step (c) is executed;
  (c) resetting the next reference polygon as a left or right branch of the previous reference polygon depending upon the direction of a first line segment of the previous reference polygon with respect to the point; and
  (d) iterating said steps (b) and (c) until step (b) determines that the point is in the reference polygon or until the binary tree has been completely traversed wherein no next reference polygon exists as a branch from the previous reference polygon.

10. The computer implemented method of claim 1, is said dropping step further comprising the substeps of:
  (a) setting a reference polygon to root of the binary tree;
  (b) setting a reference line segment as a first line segment of the reference polygon;
  (c) determining a direction from the reference line segment to the point;
  (d) storing the direction determined in said determining step (c) as a branch direction if the reference line segment is the first line segment of the reference polygon;
  (e) testing whether the direction is left;
  (f) executing step (i) if the direction determined in said determining step (c) is left;
  (g) executing step (h) if the direction determined in said determining step (c) is right;
  (h) testing if the reference line segment is the last line segment of the reference polygon including the substeps of:
    (h1) identifying the reference polygon as the polygon in which the point lies and thereby localize the object within a corresponding sector if said testing step (h) is positive, and
    (h2) setting the reference line segment as a next line segment of the reference polygon and executing step (c) if said testing step (h) is negative;
  (i) resetting the reference polygon as a left or right branch of the reference polygon depending upon the direction stored in step (d); and
  (j) stopping the method and determining that the point does not lie in any polygon if the reference polygon does not exist in the binary tree; and
  (k) iterating said steps (b)–(j) until said step (h1) identifies the reference polygon as the polygon in which the point lies or until said step (j) stops the method.

11. The computer implemented method of claim 1, wherein the surface is an airport surface, said method localizing an object within a sector of the airport surface.

12. An apparatus for localizing an object within a sector of a physical surface, comprising:
  memory means for storing a representation of the physical surface including definitions of a plurality of non-intersecting line segments wherein each endpoint of each line segment touches an endpoint of at least one other line segment and wherein no interior angle of polygons formed by the line segments exceeds 180 degrees;
  generating means for generating a list of polygons wherein each entry in the list of polygons includes a list of line segments taken from the defined line segments stored by said memory means;
  organizing means for organizing the list of polygons into a binary tree to encode relative positions of the polygons; and
  dropping means for dropping a point representing a location of the object on the physical surface down to the binary tree to determine which polygon encloses the point to thereby localize the point within a corresponding sector.

13. The apparatus for localizing an object within a sector of a physical surface according to claim 12, said generating means further comprising:
  choosing means for choosing a line segment from the defined line segments stored in said memory means;
  searching means for searching the defined line segments in a search direction for a line segment that shares an endpoint of the chosen line segment and which is right-most with respect to the chosen line segment;
  designating means for designating the right-most line segment as the chosen line segment;
  repeating means for repeating the operations of said searching means and said designating means until a duplicate line segment is found or until no right-most line segment is found for the chosen line segment;
  adding means for adding a new polygon to a polygon list when the duplicate line segment is found during the operation of said repeating means;
  means for reversing the search direction and for repeating the operation of said searching means, said designating means and said adding means if no right-most line segment is found for the chosen line segment by said searching means; and iterating means for iterating the operations of said searching means, said designating means, said repeating means, said adding means, and said reversing means until the list of polygons is empty.

14. The apparatus for localizing an object within a sector of a physical surface according to claim 12, said generating means further comprising:

choosing means for choosing a line segment from the defined line segments stored in said memory means;

searching means for searching the defined line segments in a search direction for a line segment that shares an endpoint of the chosen line segment and which is left-most with respect to the chosen line segment;

designating means for designating the left-most line segment as the chosen line segment;

repeating means for repeating the operations of said searching means and said designating means until a duplicate line segment is found or until no left-most line segment is found for the chosen line segment;

adding means for adding a new polygon to a polygon list when the duplicate line segment is found during the operation of said repeating means;

means for reversing the search direction and for repeating the operation of said searching means, said designating means and said adding means if no leftmost line segment is found for the chosen line segment by said searching means; and iterating means for iterating the operations of said searching means, said designating means, said repeating means, said adding means, and said reversing means until the list of polygons is empty.

15. The apparatus for localizing an object within a sector of a physical surface according to claim 12, said organizing means further comprising:

root polygon placing means for placing a root polygon from the list of polygons at a root of the binary tree wherein the root polygon includes a first line segment having an associated direction, the first line segment being from the root polygon's list of line segments;

reference polygon setting means for setting the root polygon as a reference polygon;

choosing means for choosing a next polygon from the list of polygons;

first determining means for determining whether the chosen polygon is to the left of the first line segment of the reference polygon;

left leaf placing means for recursively placing the chosen polygon as a left leaf of the reference polygon as long as the left leaf of the reference polygon does not exist;

first setting means for setting the chosen polygon as the reference polygon and for repeating the operation of said first determining means and said left leaf placing means if the left leaf of the reference polygon does exist;

second determining means for determining whether the chosen polygon is to the right of the first line segment of the reference polygon;

right leaf placing means for recursively placing the chosen polygon as a right leaf of the reference polygon if the right leaf of the reference polygon does not exist;

second setting means for setting the chosen polygon as the reference polygon and repeating the operation of said second determining means and said right left placing means if the right leaf of the reference polygon does exist; and means for repeating the operation of the choosing means, first determining means, left leaf placing means, first setting means, second determining means, right leaf placing means and second setting means until the list of polygons is empty.

16. The apparatus for localizing an object within a sector of a physical surface according to claim 12, said dropping means further comprising:

reference polygon setting means for setting a root of the binary tree as a reference polygon;

first determining means for determining if the point is to the left or to the right of a first line segment of the reference polygon;

second determining means for determining if the reference polygon completely encloses the point and, if the reference polygon does completely enclose the point, outputting the reference polygon as the sector containing the point;

setting means for setting the left or right branch of the reference polygon as the reference polygon based on the output of said first determining means; and means for repeating the operations of said first determining means, said second determining means and said reference polygon setting means until a reference polygon has been determined as completely enclosing the point or until the binary tree has been completely traversed.

17. The apparatus for localizing an object within a sector of a physical surface according to claim 12, said dropping means further comprising:

reference polygon setting means for setting a root of the binary tree as a reference polygon;

recursive determining means for recursively determining if the point is to the right of each line segment of a reference polygon until all line segments of the reference polygon have been processed whereupon the point is determined to be in the reference polygon or until the point is determined to be to the left of the current line segment;

resetting means for resetting the next reference polygon as a left or right branch of the previous reference polygon depending upon the direction of a first line segment of the previous reference polygon with respect to the point; and iterating means for iterating the operations of said recursive determining means and said resetting means until the binary tree has been completely traversed wherein no next reference polygons exist as a branch from the previous reference polygon.

18. The apparatus for localizing an object within a sector of a physical surface according to claim 12, wherein the physical surface is an airport surface, the apparatus further comprising:

detecting means for detecting a location of the object on the airport surface, wherein the location detected by said detecting means is represented as the point, and wherein the method locates the object within a sector of the airport surface.

* * * * *

UNITED STATES PATENT AND TRADEMARK OFFICE
CERTIFICATE OF CORRRECTION

PATENT NO. : 5,920,318
DATED : July 6, 1999
INVENTOR(S) : Gerald P. Salvatore, Jr., et al.

It is certified that error appears in the above-identified patent and that said Letters Patent is hereby corrected as shown below:

On the title page, item [56] Reference Cited, insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | 5 | 3 | 7 | 5 | 0 | 5 | 8 | 12/1994 | BASS | | | |
| | 5 | 4 | 6 | 1 | 3 | 8 | 4 | 10/1995 | SIEPRATH, ET AL. | | | |
| | 5 | 5 | 1 | 9 | 6 | 1 | 8 | 05/1996 | KASTNER, ET AL. | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | 95 | 1 | 6 | 2 | 2 | 8 | A | 06/1995 | PCT | | | | |

Signed and Sealed this

Twenty-fifth Day of April, 2000

Attest:

Q. TODD DICKINSON

*Attesting Officer*   *Director of Patents and Trademarks*